(12) United States Patent
Wang et al.

(10) Patent No.: US 11,363,607 B2
(45) Date of Patent: Jun. 14, 2022

(54) RESOURCE INDICATION METHOD AND DEVICE

(71) Applicant: Huawei Technologies Co., Ltd., Shenzhen (CN)

(72) Inventors: Da Wang, Shenzhen (CN); Yun Liu, Shenzhen (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 129 days.

(21) Appl. No.: 16/638,027

(22) PCT Filed: Aug. 10, 2017

(86) PCT No.: PCT/CN2017/096955
§ 371 (c)(1),
(2) Date: Feb. 10, 2020

(87) PCT Pub. No.: WO2019/028796
PCT Pub. Date: Feb. 14, 2019

(65) Prior Publication Data
US 2020/0221463 A1  Jul. 9, 2020

(51) Int. Cl.
*H04L 1/16* (2006.01)
*H04W 72/04* (2009.01)

(52) U.S. Cl.
CPC ....... *H04W 72/0493* (2013.01); *H04L 1/1614* (2013.01); *H04W 72/042* (2013.01); *H04W 72/0446* (2013.01); *H04W 72/0453* (2013.01)

(58) Field of Classification Search
CPC .......... H04W 72/0493; H04W 72/042; H04W 72/0446; H04W 72/0453; H04L 1/1614
(Continued)

(56) References Cited

U.S. PATENT DOCUMENTS

2010/0278123 A1* 11/2010 Fong ..................... H04L 5/0048
370/329
2014/0105151 A1    4/2014 Hong
(Continued)

FOREIGN PATENT DOCUMENTS

CN    103687042 A    3/2014
CN    104769868 A    7/2015
(Continued)

OTHER PUBLICATIONS

R1-1707200, NEC, "Frequency and time resource allocation schemes for NR," 3GPP TSG-RAN WG1 Meeting #89, Hangzhou, P.R. China, May 15-19, 2017, 6 pages.
(Continued)

*Primary Examiner* — Faisal Choudhury
(74) *Attorney, Agent, or Firm* — Conley Rose, P.C.

(57) ABSTRACT

A resource indication method includes generating, by a network device, first control information, where the first control information is used to indicate a frequency resource occupied to transmit data in N time resource units, and N is a positive integer greater than or equal to 2; and sending, by the network device, the first control information to a terminal device. Therefore, the network device may indicate, for the scheduled N time resource units, the frequency resource occupied to transmit data in the N time resource units.

20 Claims, 19 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2014/0376458 | A1* | 12/2014 | Ryu | ............... H04W 52/383 |
| | | | | 370/329 |
| 2015/0139164 | A1* | 5/2015 | Yano | ............... H04W 72/042 |
| | | | | 370/329 |
| 2015/0223216 | A1 | 8/2015 | Han et al. | |
| 2016/0088594 | A1 | 3/2016 | Xiong et al. | |
| 2016/0128037 | A1* | 5/2016 | Park | ............... H04B 7/0413 |
| | | | | 370/312 |
| 2016/0128086 | A1* | 5/2016 | Dinan | ............... H04W 72/1278 |
| | | | | 370/329 |
| 2016/0150562 | A1* | 5/2016 | Nakamura | ........ H04W 72/1294 |
| | | | | 370/329 |
| 2017/0264399 | A1 | 9/2017 | Li et al. | |
| 2019/0141684 | A1 | 5/2019 | Suzuki et al. | |
| 2019/0149287 | A1* | 5/2019 | Cheng | ............... H04L 1/0003 |
| | | | | 370/280 |
| 2019/0200355 | A1 | 6/2019 | Baldemair et al. | |
| 2020/0068535 | A1 | 2/2020 | Wang et al. | |

FOREIGN PATENT DOCUMENTS

| | | |
|---|---|---|
| CN | 105917598 A | 8/2016 |
| CN | 106385709 A | 2/2017 |
| CN | 106664517 A | 5/2017 |
| CN | 106793123 A | 5/2017 |
| CN | 108811105 A | 11/2018 |
| CN | 110622453 A | 12/2019 |
| EP | 3361686 A1 | 8/2018 |
| WO | 2011013986 A2 | 2/2011 |
| WO | 2017066967 A1 | 4/2017 |

OTHER PUBLICATIONS

R1-1710953, InterDigital, Inc., "On frequency-domain resource allocation for NR," 3GPP TSG RAN WG1 NR Ad-Hoc#2, Qingdao, P.R. China, Jun. 27-30, 2017, 6 pages.

R1-1707844, MediaTek Inc., "The starting and ending position in time domain of PUSCH," 3GPP TSG RAN WG1 Meeting #89, Hangzhou, P.R. China, May 15-19, 2017, 4 pages.

R1-1705067, Huawei, HiSilicon, "Scheduling scheme for slot aggregation," 3GPP TSG RAN WG1 Meeting #88bis, Spokane, USA, Apr. 3-7, 2017, 7 pages.

R1-1710324, LG Electronics, "Discussion on time-domain resource allocation," 3GPP TSG RAN WG1 NR Ad-Hoc#2, Qingdao, P.R. China, Jun. 27-30, 2017, 3 pages.

* cited by examiner

RESOURCE INDICATION METHOD AND DEVICE

CROSS-REFERENCE TO RELATED APPLICATIONS

This application is a National Stage of International Patent Application No. PCT/CN2017/096955 filed on Aug. 10, 2017, which is hereby incorporated by reference in its entirety.

TECHNICAL FIELD

Embodiments of this application relate to the communications field, and in particular, to a resource indication method and a device.

BACKGROUND

In a long term evolution (long term evolution. LTE) system, one piece of downlink control signaling can be used to schedule only one transport block (transport block, TB) to be transmitted in one subframe. A network device can transmit only one TB to a terminal in one subframe, or a terminal can transmit only one TB to a network device in one subframe. Therefore, one or more TBs cannot be scheduled for transmission in a plurality of subframes (that is, one TB cannot be transmitted across subframes). A scheduling unit of LTE is a subframe.

In a 5G new radio (new radio, NR) system, a scheduling unit is a slot or a subframe, and slot or subframe aggregation is supported. Therefore, one piece of downlink control signaling may be used to schedule one TB to be transmitted in a plurality of slots or subframes, or schedule a plurality of TBs to be transmitted in a plurality of slots or subframes, as shown in FIG. 1(a) and FIG. 1(b).

However, in a slot aggregation (slot aggregation) scenario, because one piece of downlink control information (Downlink Control Information, DCI) may schedule a plurality of slots (slot), a frequency resource and/or a time resource occupied to transmit data in each slot needs to be indicated. Consequently, DCI overheads are relatively high.

SUMMARY

This application provides a resource indication method and a device, to resolve a problem that DCI overheads are relatively high in a slot aggregation scenario.

According to a first aspect, this application provides a resource indication method, including: generating, by a network device, first control information, where the first control information is used to indicate a frequency resource occupied to transmit data in N time resource units, and N is a positive integer greater than or equal to 2: and sending, by the network device, the first control information to a terminal device.

Therefore, according to the method provided in this application, the network device may indicate, for the scheduled N time resource units, the frequency resource occupied to transmit data in the N time resource units, thereby reducing DCI overheads.

In a possible design, the first control information indicates a first frequency resource, and the first frequency resource is a frequency resource occupied to transmit data in each of the N time resource units.

The foregoing form is applicable to a scenario in which data transmission in each time resource unit occupies a same frequency resource. Therefore, the first control information needs to indicate only one frequency resource, thereby effectively reducing control signaling overheads.

In a possible design, the first control information indicates a second frequency resource, the second frequency resource is a frequency resource occupied to transmit data in M of the N time resource units, M<N, and M is a positive integer greater than or equal to 2; and the first control information further indicates a frequency resource occupied to transmit data in each time resource unit other than the M time resource units of the N time resource units.

The foregoing manner is applicable to a case in which frequency resources occupied to transmit data in some of the N time resource units are the same, and frequency resources occupied to transmit data in the other time resource units are different. Therefore, this manner has scheduling flexibility to some extent, and can reduce signaling overheads to some extent.

In a possible design, the first control information indicates a third frequency resource and an offset between the third frequency resource and a frequency resource occupied to transmit data in a time resource unit other than a first time resource unit of the N time resource units, and the third frequency resource is a frequency resource occupied to transmit data in the first time resource unit of the N time resource units; or the first control information indicates a third frequency resource and an offset between a frequency resource occupied to transmit data in an $i^{th}$ time resource unit and a frequency resource occupied to transmit data in an $(i-1)^{th}$ time resource unit, and i is a positive integer from 2 to N; or the first control information indicates a third frequency resource and an offset between a frequency resource occupied to transmit data in a $j^{th}$ time resource unit and a frequency resource occupied to transmit data in a $(j+1)^{th}$ time resource unit, and j is a positive integer from 1 to N−1; or the first control information indicates an offset between a fourth frequency resource and a frequency resource occupied to transmit data in each of the N time resource units, and the fourth frequency resource is a configured or preconfigured frequency resource; or the first control information indicates an offset between a fourth frequency resource and a frequency resource occupied to transmit data in a first time resource unit of the N time resource units, and an offset between a frequency resource occupied to transmit data in a $p^{th}$ time resource unit and a frequency resource occupied to transmit data in a $(p-1)^{th}$ time resource unit, and p is a positive integer from 2 to N; or the first control information indicates an offset between a fourth frequency resource and a frequency resource occupied to transmit data in a first time resource unit of the N time resource units, and an offset between a frequency resource occupied to transmit data in a $q^{th}$ time resource unit and a frequency resource occupied to transmit data in a $(q+1)^{th}$ time resource unit, and q is a positive integer from 1 to N−1, where the first time resource unit is any one of the N time resource units.

Therefore, this manner ensures scheduling flexibility, can obtain a frequency diversity gain between time resource units, and reduces signaling overheads.

In a possible design, the offset is at least one of the following: a bit offset in a bitmap, a subcarrier offset, a physical resource block PRB offset, a virtual resource block VRB offset, a resource block group RBG offset, and a multiple of a step value, where the step value is a bit quantity, a subcarrier quantity, a PRB quantity, a VRB quantity, an RBG quantity, or 1/K of a carrier bandwidth, where K is a positive integer.

Therefore, the offset may be in a plurality of forms, thereby improving flexibility of the solution.

In a possible design, the N time resource units each are one of a symbol, a slot, a mini-slot, a subframe, or a frame.

In addition, the N time resource units may be different. For example, some of the N time resource units are slots, and some time resource units are mini slots. Therefore, the N time resource units may be configured based on an actual requirement.

According to a second aspect, this application provides a resource indication method, including: generating, by a network device, first control information, where the first control information is used to indicate a time resource occupied to transmit data in N time resource units, and N is a positive integer greater than or equal to 1; and sending, by the network device, the first control information to a terminal device.

Therefore, according to the method provided in this application, the network device may indicate, for the scheduled N time resource units, the time resource occupied to transmit data in the N time resource units, thereby reducing DCI overheads.

In a possible design, the first control information indicates a first time resource, and the first time resource is a time resource occupied to transmit data in each of the N time resource units.

The foregoing manner is applicable to a scenario in which data transmission in each time resource unit occupies a same time resource. Therefore, the first control information needs to indicate only one time resource, thereby effectively reducing control signaling overheads.

In a possible design, the first control information indicates a second time resource, the second time resource is a time resource occupied to transmit data in M of the N time resource units, M<N, and M is a positive integer greater than or equal to 2; and the first control information further indicates a time resource occupied to transmit data in each time resource unit other than the M time resource units of the N time resource units.

The foregoing manner is applicable to a scenario in which time resources occupied to transmit data in some of the N time resource units are the same, and time resources occupied to transmit data in the other time resource units are different. This manner has scheduling flexibility to some extent, and can reduce signaling overheads to some extent.

In a possible design, the first control information indicates a third time resource and an offset between the third time resource and a time resource occupied to transmit data in a time resource unit other than a first time resource unit of the N time resource units, and the third time resource is a time resource occupied to transmit data in the first time resource unit of the N time resource units; or the first control information indicates a third time resource and an offset between a time resource occupied to transmit data in an $i^{th}$ time resource unit and a time resource occupied to transmit data in an $(i-1)^{th}$ time resource unit, i>2, and i is a positive integer from 2 to N; or the first control information indicates a third time resource and an offset between a time resource occupied to transmit data in a $j^{th}$ time resource unit and a time resource occupied to transmit data in a $(j+1)^{th}$ time resource unit, and j is a positive integer from 1 to N-1; or the first control information indicates an offset between a fourth time resource and a time resource occupied to transmit data in each of the N time resource units, and the fourth time resource is a configured or preconfigured time resource; or the first control information indicates an offset between a fourth time resource and a time resource occupied to transmit data in a first time resource unit of the N time resource units, and an offset between a time resource occupied to transmit data in a $p^{th}$ time resource unit and a time resource occupied to transmit data in a $(p-1)^{th}$ time resource unit, and p is a positive integer from 2 to N; or the first control information indicates an offset between a fourth time resource and a time resource occupied to transmit data in a first time resource unit of the N time resource units, and an offset between a time resource occupied to transmit data in a $q^{th}$ time resource unit and a time resource occupied to transmit data in a $(q+1)^{th}$ time resource unit, and q is a positive integer from 1 to N-1, where the first time resource unit is any one of the N time resource units.

Therefore, the foregoing manner can ensure scheduling flexibility, and can reduce DCI overheads.

In a possible design, the offset is a symbol quantity, a mini-slot quantity, a multiple of a symbol quantity, or a multiple of a mini-slot quantity.

In addition, the offset may alternatively be a multiple of a step value. The step value is 1/K of a total symbol quantity in a slot or a subframe, and K is a positive integer. The step value is configured or preconfigured. Therefore, the offset may be in a plurality of forms, thereby improving flexibility of the solution.

In a possible design, when the time resource indicated by the first control information is a time resource occupied when the network device sends data to the terminal device, the first control information indicates that a start symbol of a time resource occupied to transmit data in a $k^{th}$ time resource unit is a first symbol of the $k^{th}$ time resource unit, or is a first symbol after a symbol occupied by control signaling in the $k^{th}$ time resource unit, and the first control information indicates that an end symbol of the time resource occupied to transmit data in the $k^{th}$ time resource unit is a last symbol of the $k^{th}$ time resource unit, or is a last symbol before the symbol occupied by the control signaling in the $k^{th}$ time resource unit or before a symbol occupied by a gap in the $k^{th}$ time resource unit; or when the time resource indicated by the first control information is a time resource occupied when the terminal device sends data to the network device, the first control information indicates that a start symbol of a time resource occupied to transmit data in a $k^{th}$ time resource unit is a first symbol of the $k^{th}$ time resource unit, or is a first symbol after a symbol occupied by control signaling or a gap in the $k^{th}$ time resource unit, and the first control information indicates that an end symbol of the time resource occupied to transmit data in the $k^{th}$ time resource unit is a last symbol of the $k^{th}$ time resource unit, or is a last symbol before the symbol occupied by the control signaling in the $k^{th}$ time resource unit, where k is 1 or a positive integer from 1 to N.

Therefore, the foregoing manner can effectively reduce signaling overheads.

In a possible design, the N time resource units each are one of a symbol, a slot, a mini-slot, a subframe, or a frame.

In addition, the N time resource units may be different. For example, some of the N time resource units are slots, and some time resource units are mini slots. Therefore, the N time resource units may be configured based on an actual requirement.

According to a third aspect, this application provides a resource indication method, including: receiving, by a terminal device, first control information sent by a network device, where the first control information is used to indicate a frequency resource occupied to transmit data in N time resource units, and N is a positive integer greater than or equal to 2; and sending, by the terminal device, data to the network device on the frequency resource indicated by the first control information, or receiving, by the terminal device on the frequency resource indicated by the first control information, data sent by the network device.

In a possible design, the first control information indicates a first frequency resource, and the first frequency resource is a frequency resource occupied to transmit data in each of the N time resource units.

In a possible design, the first control information indicates a second frequency resource, the second frequency resource is a frequency resource occupied to transmit data in M of the N time resource units, M<N, and M is a positive integer greater than or equal to 2; and the first control information further indicates a frequency resource occupied to transmit data in each time resource unit other than the M time resource units of the N time resource units.

In a possible design, the first control information indicates a third frequency resource and an offset between the third frequency resource and a frequency resource occupied to transmit data in a time resource unit other than a first time resource unit of the N time resource units, and the third frequency resource is a frequency resource occupied to transmit data in the first time resource unit of the N time resource units; or the first control information indicates a third frequency resource and an offset between a frequency resource occupied to transmit data in an $i^{th}$ time resource unit and a frequency resource occupied to transmit data in an $(i-1)^{th}$ time resource unit, and i is a positive integer from 2 to N; or the first control information indicates a third frequency resource and an offset between a frequency resource occupied to transmit data in a $j^{th}$ time resource unit and a frequency resource occupied to transmit data in a $(j+1)^{th}$ time resource unit, and j is a positive integer from 1 to N−1; or the first control information indicates an offset between a fourth frequency resource and a frequency resource occupied to transmit data in each of the N time resource units, and the fourth frequency resource is a configured or preconfigured frequency resource; or the first control information indicates an offset between a fourth frequency resource and a frequency resource occupied to transmit data in a first time resource unit of the N time resource units, and an offset between a frequency resource occupied to transmit data in a $p^{th}$ time resource unit and a frequency resource occupied to transmit data in a $(p-1)^{th}$ time resource unit, and p is a positive integer from 2 to N; or the first control information indicates an offset between a fourth frequency resource and a frequency resource occupied to transmit data in a first time resource unit of the N time resource units, and an offset between a frequency resource occupied to transmit data in a $q^{th}$ time resource unit and a frequency resource occupied to transmit data in a $(q+1)^{th}$ time resource unit, and q is a positive integer from 1 to N−1, where the first time resource unit is any one of the N time resource units.

In a possible design, the offset is at least one of the following: a bit offset in a bitmap, a subcarrier offset, a physical resource block PRB offset, a virtual resource block VRB offset, a resource block group RBG offset, and a multiple of a step value, where the step value is a bit quantity, a subcarrier quantity, a PRB quantity, a VRB quantity, an RBG quantity, or 1/K of a carrier bandwidth, where K is a positive integer.

In a possible design, the N time resource units each are one of a symbol, a slot, a mini-slot, a subframe, or a frame.

According to a fourth aspect, this application provides a resource indication method, including: receiving, by a terminal device, first control information sent by a network device, where the first control information is used to indicate a time resource occupied to transmit data in N time resource units, and N is a positive integer greater than or equal to 1; and sending, by the terminal device, data to the network device on the time resource indicated by the first control information, or receiving, by the terminal device on the time resource indicated by the first control information, data sent by the network device.

In a possible design, the first control information indicates a first time resource, and the first time resource is a time resource occupied to transmit data in each of the N time resource units.

In a possible design, the first control information indicates a second time resource, the second time resource is a time resource occupied to transmit data in M of the N time resource units, M<N, and M is a positive integer greater than or equal to 2; and the first control information further indicates a time resource occupied to transmit data in each time resource unit other than the M time resource units of the N time resource units.

In a possible design, the first control information indicates a third time resource and an offset between the third time resource and a time resource occupied to transmit data in a time resource unit other than a first time resource unit of the N time resource units, and the third time resource is a time resource occupied to transmit data in the first time resource unit of the N time resource units; or the first control information indicates a third time resource and an offset between a time resource occupied to transmit data in an $i^{th}$ time resource unit and a time resource occupied to transmit data in an $(i-1)^{th}$ time resource unit, i≥2, and i is a positive integer from 2 to N; or the first control information indicates a third time resource and an offset between a time resource occupied to transmit data in a $j^{th}$ time resource unit and a time resource occupied to transmit data in a $(j+1)^{th}$ time resource unit, and j is a positive integer from 1 to N−1; or the first control information indicates an offset between a fourth time resource and a time resource occupied to transmit data in each of the N time resource units, and the fourth time resource is a configured or preconfigured time resource; or the first control information indicates an offset between a fourth time resource and a time resource occupied to transmit data in a first time resource unit of the N time resource units, and an offset between a time resource occupied to transmit data in a $p^{th}$ time resource unit and a time resource occupied to transmit data in a $(p-1)^{th}$ time resource unit, and p is a positive integer from 2 to N; or the first control information indicates an offset between the fourth time resource and the time resource occupied to transmit data in the first time resource unit of the N time resource units, and an offset between a time resource occupied to transmit data in a $q^{th}$ time resource unit and a time resource occupied to transmit data in a $(q+1)^{th}$ time resource unit, and q is a positive integer from 1 to N−1, where the first time resource unit is any one of the N time resource units.

In a possible design, the offset is a symbol quantity, a mini-slot quantity, a multiple of a symbol quantity, or a multiple of a mini-slot quantity.

In a possible design, when the time resource indicated by the first control information is a time resource occupied when the network device sends data to the terminal device, the first control information indicates that a start symbol of a time resource occupied to transmit data in a $k^{th}$ time resource unit is a first symbol of the $k^{th}$ time resource unit, or is a first symbol after a symbol occupied by control signaling in the $k^{th}$ time resource unit, and the first control information indicates that an end symbol of the time resource occupied to transmit data in the $k^{th}$ time resource unit is a last symbol of the $k^{th}$ time resource unit, or is a last symbol before the symbol occupied by the control signaling in the $k^{th}$ time resource unit or before a symbol occupied by a gap in the $k^{th}$ time resource unit; or when the time resource indicated by the first control information is a time resource occupied when the terminal device sends data to the network device, the first control information indicates that a start symbol of a time resource occupied to transmit data in a $k^{th}$ time resource unit is a first symbol of the $k^{th}$ time resource unit, or is a first symbol after a symbol occupied by control signaling or a gap in the $k^{th}$ time resource unit, and the first control information indicates that an end symbol of the time resource occupied to transmit data in the k time resource unit is a last symbol of the $k^{th}$ time resource unit, or is a last symbol before the symbol occupied by the control signaling in the $k^{th}$ time resource unit, where k is 1 or a positive integer from 1 to N.

In a possible design, the N time resource units each are one of a symbol, a slot, a mini-slot, a subframe, or a frame.

According to a fifth aspect, this application provides a resource indication apparatus, including: a processing unit, a sending unit, and a receiving unit. The processing unit is configured to generate first control information, where the first control information is used to indicate a frequency resource occupied to transmit data in N time resource units, and N is a positive integer greater than or equal to 2; and the sending unit is configured to send the first control information to a terminal device.

In a possible design, the first control information indicates a first frequency resource, and the first frequency resource is a frequency resource occupied to transmit data in each of the N time resource units.

In a possible design, the first control information indicates a second frequency resource, the second frequency resource is a frequency resource occupied to transmit data in M of the N time resource units, M<N, and M is a positive integer greater than or equal to 2; and the first control information further indicates a frequency resource occupied to transmit data in each time resource unit other than the M time resource units of the N time resource units.

In a possible design, the first control information indicates a third frequency resource and an offset between the third frequency resource and a frequency resource occupied to transmit data in a time resource unit other than a first time resource unit of the N time resource units, and the third frequency resource is a frequency resource occupied to transmit data in the first time resource unit of the N time resource units; or the first control information indicates a third frequency resource and an offset between a frequency resource occupied to transmit data in an $i^{th}$ time resource unit and a frequency resource occupied to transmit data in an $(i-1)^{th}$ time resource unit, and i is a positive integer from 2 to N; or the first control information indicates a third frequency resource and an offset between a frequency resource occupied to transmit data in a $j^{th}$ time resource unit and a frequency resource occupied to transmit data in a $(j+1)^{th}$ time resource unit, and j is a positive integer from 1 to N−1; or the first control information indicates an offset between a fourth frequency resource and a frequency resource occupied to transmit data in each of the N time resource units, and the fourth frequency resource is a configured or preconfigured frequency resource; or the first control information indicates an offset between a fourth frequency resource and a frequency resource occupied to transmit data in a first time resource unit of the N time resource units, and an offset between a frequency resource occupied to transmit data in a $p^{th}$ time resource unit and a frequency resource occupied to transmit data in a (p−1) time resource unit, and p is a positive integer from 2 to N; or the first control information indicates an offset between a fourth frequency resource and a frequency resource occupied to transmit data in a first time resource unit of the N time resource units, and an offset between a frequency resource occupied to transmit data in a $q^{th}$ time resource unit and a frequency resource occupied to transmit data in a $(q+1)^{th}$ time resource unit, and q is a positive integer from 1 to N−1, where the first time resource unit is any one of the N time resource units.

In a possible design, the offset is at least one of the following: a bit offset in a bitmap, a subcarrier offset, a PRB offset, a VRB offset, an RBG offset, and a multiple of a step value, where the step value is a bit quantity, a subcarrier quantity, a PRB quantity, a VRB quantity, an RBG quantity, or 1/K of a carrier bandwidth, where K is a positive integer.

In a possible design, the N time resource units each are one of a symbol, a slot, a mini-slot, a subframe, or a frame.

According to a sixth aspect, this application provides a resource indication apparatus, including: a processing unit and a sending unit. The processing unit is configured to generate first control information, where the first control information is used to indicate a time resource occupied to transmit data in N time resource units, and N is a positive integer greater than or equal to 1; and the sending unit is configured to send the first control information to a terminal device.

In a possible design, the first control information indicates a first time resource, and the first time resource is a time resource occupied to transmit data in each of the N time resource units.

In a possible design, the first control information indicates a second time resource, the second time resource is a time resource occupied to transmit data in M of the N time resource units, M<N, and M is a positive integer greater than or equal to 2; and the first control information further indicates a time resource occupied to transmit data in each time resource unit other than the M time resource units of the N time resource units.

In a possible design, the first control information indicates a third time resource and an offset between the third time resource and a time resource occupied to transmit data in a time resource unit other than a first time resource unit of the N time resource units, and the third time resource is a time resource occupied to transmit data in the first time resource unit of the N time resource units; or the first control information indicates a third time resource and an offset between a time resource occupied to transmit data in an i time resource unit and a time resource occupied to transmit data in an $(i-1)^{th}$ time resource unit, i≥2, and i is a positive integer from 2 to N; or the first control information indicates a third time resource and an offset between a time resource occupied to transmit data in a $j^{th}$ time resource unit and a time resource occupied to transmit data in a $(j+1)^{th}$ time resource unit, and j is a positive integer from 1 to N−1; or the first control information indicates an offset between a fourth time resource and a time resource occupied to transmit data in each of the N time resource units, and the fourth time resource is a configured or preconfigured time resource; or the first control information indicates an offset between a fourth time resource and a time resource occupied to transmit data in a first time resource unit of the N time resource units, and an offset between a time resource occupied to transmit data in a $p^{th}$ time resource unit and a time resource occupied to transmit data in a $(p-1)^{th}$ time resource unit, and p is a positive integer from 2 to N; or the first control information indicates an offset between a fourth time resource and a time resource occupied to transmit data in a first time resource unit of the N time resource units, and an offset between a time resource occupied to transmit data in a $q^{th}$ time resource unit and a time resource occupied to transmit data in a $(q+1)^{th}$ time resource unit, and q is a positive integer from 1 to N−1, where the first time resource unit is any one of the N time resource units.

In a possible design, the offset is a symbol quantity, a mini-slot quantity, a multiple of a symbol quantity, or a multiple of a mini-slot quantity.

In a possible design, when the time resource indicated by the first control information is a time resource occupied when the sending unit sends data to the terminal device, the first control information indicates that a start symbol of a time resource occupied to transmit data in a $k^{th}$ time resource unit is a first symbol of the $k^{th}$ time resource unit, or is a first symbol after a symbol occupied by control signaling in the $k^{th}$ time resource unit, and the first control information indicates that an end symbol of the time resource occupied to transmit data in the $k^{th}$ time resource unit is a last symbol of the $k^{th}$ time resource unit, or is a last symbol before the symbol occupied by the control signaling in the $k^{th}$ time resource unit or before a symbol occupied by a gap in the $k^{th}$ time resource unit; or when the time resource indicated by the first control information is a time resource occupied when the receiving unit receives data sent by the terminal device, the first control information indicates that a start symbol of a time resource occupied to transmit data in a $k^{th}$ time resource unit is a first symbol of the $k^{th}$ time resource unit, or is a first symbol after a symbol occupied by control signaling or a gap in the $k^{th}$ time resource unit, and the first control information indicates that an end symbol of the time resource occupied to transmit data in the $k^{th}$ time resource unit is a last symbol of the $k^{th}$ time resource unit, or is a last symbol before the symbol occupied by the control signaling in the $k^{th}$ time resource unit, where k is 1 or a positive integer from 1 to N.

In a possible design, the N time resource units are one of a symbol, a slot, a mini-slot, a subframe, or a frame.

According to a seventh aspect, this application provides a resource indication apparatus, including: a receiving unit and a sending unit. The receiving unit is configured to receive first control information sent by a network device, where the first control information is used to indicate a frequency resource occupied to transmit data in N time resource units, and N is a positive integer greater than or equal to 2; and the sending unit is configured to send data to the network device on the frequency resource indicated by the first control information, or the receiving unit is further configured to receive, on the frequency resource indicated by the first control information, data sent by the network device.

In a possible design, the first control information indicates a first frequency resource, and the first frequency resource is a frequency resource occupied to transmit data in each of the N time resource units.

In a possible design, the first control information indicates a second frequency resource, the second frequency resource is a frequency resource occupied to transmit data in M of the N time resource units, M<N, and M is a positive integer greater than or equal to 2; and the first control information further indicates a frequency resource occupied to transmit data in each time resource unit other than the M time resource units of the N time resource units.

In a possible design, the first control information indicates a third frequency resource and an offset between the third frequency resource and a frequency resource occupied to transmit data in a time resource unit other than a first time resource unit of the N time resource units, and the third frequency resource is a frequency resource occupied to transmit data in the first time resource unit of the N time resource units; or the first control information indicates a third frequency resource and an offset between a frequency resource occupied to transmit data in an $i^{th}$ time resource unit and a frequency resource occupied to transmit data in an $(i-1)^{th}$ time resource unit, and i is a positive integer from 2 to N; or the first control information indicates a third frequency resource and an offset between a frequency resource occupied to transmit data in a $j^{th}$ time resource unit and a frequency resource occupied to transmit data in a $(j+1)^{th}$ time resource unit, and j is a positive integer from 1 to N−1; or the first control information indicates an offset between a fourth frequency resource and a frequency resource occupied to transmit data in each of the N time resource units, and the fourth frequency resource is a configured or preconfigured frequency resource; or the first control information indicates an offset between a fourth frequency resource and a frequency resource occupied to transmit data in a first time resource unit of the N time resource units, and an offset between a frequency resource occupied to transmit data in a $p^{th}$ time resource unit and a frequency resource occupied to transmit data in a $(p-1)^{th}$ time resource unit, and p is a positive integer from 2 to N; or the first control information indicates an offset between a fourth frequency resource and a frequency resource occupied to transmit data in a first time resource unit of the N time resource units, and an offset between a frequency resource occupied to transmit data in a $q^{th}$ time resource unit and a frequency resource occupied to transmit data in a $(q+1)^{th}$ time resource unit, and q is a positive integer from 1 to N−1, where the first time resource unit is any one of the N time resource units.

In a possible design, the offset is at least one of the following: a bit offset in a bitmap, a subcarrier offset, a physical resource block PRB offset, a virtual resource block VRB offset, a resource block group RBG offset, and a multiple of a step value, where the step value is a bit quantity, a subcarrier quantity, a PRB quantity, a VRB quantity, an RBG quantity, or 1/K of a carrier bandwidth, where K is a positive integer.

In a possible design, the N time resource units each are one of a symbol, a slot, a mini-slot, a subframe, or a frame.

According to an eighth aspect, this application provides a resource indication apparatus, including: a sending unit and a receiving unit. The receiving unit is configured to receive first control information sent by a network device, where the first control information is used to indicate a time resource occupied to transmit data in N time resource units, and N is a positive integer greater than or equal to 1; and the sending unit is configured to send data to the network device on the time resource indicated by the first control information, or the receiving unit is configured to receive, on the time resource indicated by the first control information, data sent by the network device.

In a possible design, the first control information indicates a first time resource, and the first time resource is a time resource occupied to transmit data in each of the N time resource units.

In a possible design, the first control information indicates a second time resource, the second time resource is a time resource occupied to transmit data in M of the N time resource units, M<N. and M is a positive integer greater than or equal to 2; and the first control information further indicates a time resource occupied to transmit data in each time resource unit other than the M time resource units of the N time resource units.

In a possible design, the first control information indicates a third time resource and an offset between the third time resource and a time resource occupied to transmit data in a time resource unit other than a first time resource unit of the N time resource units, and the third time resource is a time resource occupied to transmit data in the first time resource unit of the N time resource units; or the first control information indicates a third time resource and an offset between a time resource occupied to transmit data in an $i^{th}$ time resource unit and a time resource occupied to transmit data in an $(i-1)^{th}$ time resource unit, i≥2, and i is a positive integer from 2 to N; or the first control information indicates a third time resource and an offset between a time resource occupied to transmit data in a $j^{th}$ time resource unit and a time resource occupied to transmit data in a $(j+1)^{th}$ time resource unit, and j is a positive integer from 1 to N−1; or the first control information indicates an offset between a fourth time resource and a time resource occupied to transmit data in each of the N time resource units, and the fourth time resource is a configured or preconfigured time resource; or the first control information indicates an offset between a fourth time resource and a time resource occupied to transmit data in a first time resource unit of the N time resource units, and an offset between a time resource occupied to transmit data in a $p^{th}$ time resource unit and a time resource occupied to transmit data in a $(p-1)^{th}$ time resource unit, and p is a positive integer from 2 to N; or the first control information indicates an offset between a fourth time resource and a time resource occupied to transmit data in a first time resource unit of the N time resource units, and an offset between a time resource occupied to transmit data in a $q^{th}$ time resource unit and a time resource occupied to transmit data in a $(q+1)^{th}$ time resource unit, and q is a positive integer from 1 to N−1, where the first time resource unit is any one of the N time resource units.

In a possible design, the offset is a symbol quantity, a mini-slot quantity, a multiple of a symbol quantity, or a multiple of a mini-slot quantity.

In a possible design, when the time resource indicated by the first control information is a time resource occupied when the receiving unit receives data sent by the network device, the first control information indicates that a start symbol of a time resource occupied to transmit data in a $k^{th}$ time resource unit is a first symbol of the $k^{th}$ time resource unit, or is a first symbol after a symbol occupied by control signaling in the $k^{th}$ time resource unit, and the first control information indicates that an end symbol of the time resource occupied to transmit data in the $k^{th}$ time resource unit is a last symbol of the $k^{th}$ time resource unit, or is a last symbol before the symbol occupied by the control signaling in the $k^{th}$ time resource unit or before a symbol occupied by a gap in the $k^{th}$ time resource unit; or when the time resource indicated by the first control information is a time resource occupied when the sending unit sends data to the network device, the first control information indicates that a start symbol of a time resource occupied to transmit data in a $k^{th}$ time resource unit is a first symbol of the $k^{th}$ time resource unit, or is a first symbol after a symbol occupied by control signaling or a gap in the $k^{th}$ time resource unit, and the first control information indicates that an end symbol of the time resource occupied to transmit data in the $k^{th}$ time resource unit is a last symbol of the $k^{th}$ time resource unit, or is a last symbol before the symbol occupied by the control signaling in the $k^{th}$ time resource unit, where k is 1 or a positive integer from 1 to N.

In a possible design, the N time resource units each are one of a symbol, a slot, a mini-slot, a subframe, or a frame.

According to a ninth aspect, this application further provides a network device. The network device has a function of implementing an action of the network device in the method embodiments of the first aspect and the second aspect. A structure of the network device includes a processor, a transceiver, and a memory. The transceiver is configured to communicate and interact with a terminal, the memory is configured to store a program, and when executing the program stored in the memory, the processor performs the methods in the first aspect and the second aspect.

According to a tenth aspect, this application further provides a terminal device. The network device has a function of implementing an action of the terminal device in the method embodiments of the third aspect and the fourth aspect. A structure of the terminal device includes a processor, a transceiver, and a memory. The transceiver is configured to communicate and interact with a terminal, the memory is configured to store a program, and when executing the program stored in the memory, the processor performs the methods in the third aspect and the fourth aspect.

According to an eleventh aspect, this application further provides a communications system. The communications system includes a network device and a terminal device.

According to a twelfth aspect, this application further provides a first computer storage medium storing a computer executable instruction, where the computer executable instruction is used to perform the methods in the first aspect and the second aspect.

According to a thirteenth aspect, this application further provides a second computer storage medium storing a computer executable instruction, where the computer executable instruction is used to perform the methods in the third aspect and the fourth aspect.

According to a fourteenth aspect, this application further provides a first computer program product, where the computer program product includes a computer program stored in the foregoing first computer storage medium, the computer program includes a program instruction, and when the program instruction is executed by a computer, the computer is enabled to perform the methods in the first aspect and second aspect.

According to a fifteenth aspect, this application further provides a second computer program product, where the computer program product includes a computer program stored in the foregoing second computer storage medium, the computer program includes a program instruction, and when the program instruction is executed by a computer, the computer is enabled to perform the methods in the third aspect and fourth aspect.

According to a sixteenth aspect, this application further provides a chip, where the chip is connected to a memory, and is configured to read and execute a program stored in the memory, to implement the methods in the first aspect and the second aspect.

According to a seventeenth aspect, this application further provides a chip, where the chip is connected to a memory, and is configured to read and execute a program stored in the memory, to implement the methods in the third aspect and the fourth aspect.

DESCRIPTION OF EMBODIMENTS

Figure 1A:
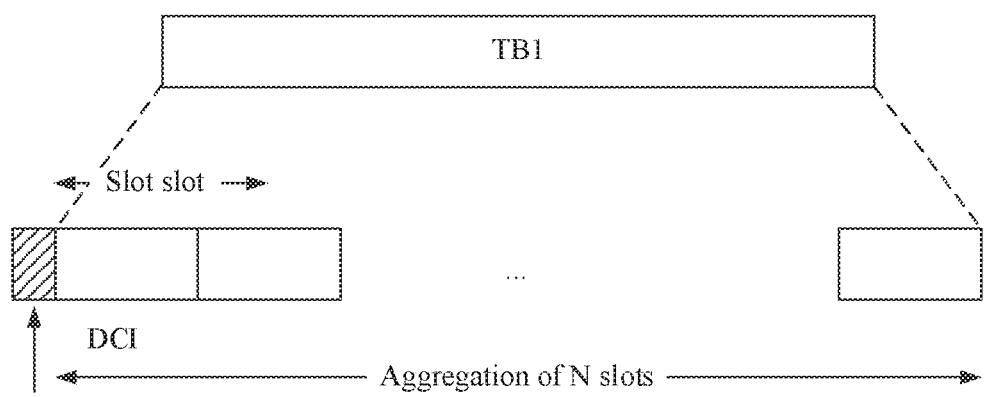
FIG. 1(a) is a schematic diagram of scheduling, by using one piece of downlink control signaling, one TB to be transmitted in a plurality of slots according to this application.
Figure 1B:
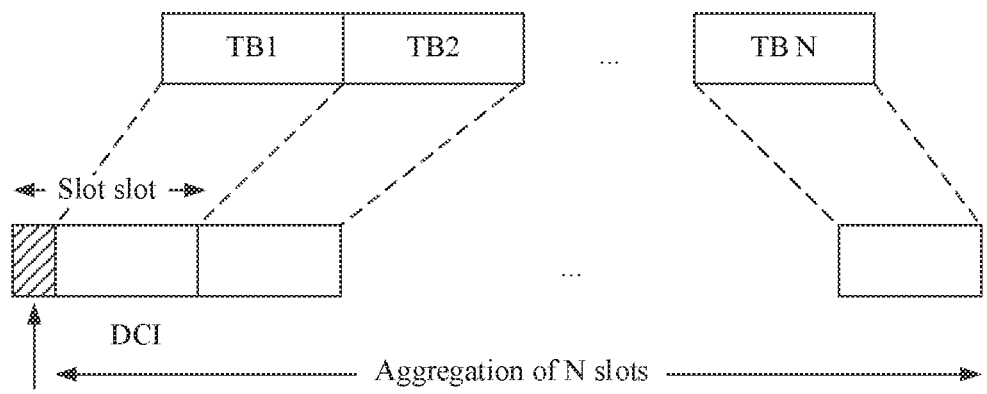
FIG. 1(b) is a schematic diagram of scheduling, by using one piece of downlink control signaling, a plurality of TBs to be transmitted in a plurality of slots according to this application.

The following describes the embodiments of this application with reference to the accompanying drawings.

First, a method for indicating a frequency resource in an LTE system is briefly described. In the LTE system, only a frequency resource occupied to transmit uplink and downlink data in one time resource unit is indicated. A specific indication manner is as follows:

Resource allocation types of a physical downlink shared channel (Physical Downlink Shared Channel, PDSCH) include: resource allocation types 0, 1, and 2.

In the resource allocation type 0, a bitmap (bitmap) is used to indicate a resource block group (Resource block group, RBG) allocated to a terminal device.

In the resource allocation type 1, a bitmap is used to indicate a virtual resource block (Virtual Resource Block, VRB) allocated to a terminal device.

In the resource allocation type 2, a start location of contiguously allocated VRBs and a length of the VRBs are indicated, to indicate a segment of contiguous VRBs.

Resource allocation types of a physical uplink shared channel (Physical Downlink Shared Channel, PDSCH) include: resource allocation types 0 and 1.

In the resource allocation type 0, which is similar to the resource allocation type 2 of the PDSCH, a start location of VRBs and a length of contiguously allocated VRBs are indicated, to indicate a segment of contiguous VRBs.

In the resource allocation type 1, resource allocation information indicates two resource block (Resource Block, RB) sets allocated to UE, each set includes one or more contiguous RBGs, and a start location and an end location of each RB set are indicated.

Network elements used in the embodiments of this application include a network device and a terminal. The network device is an access device that is in a mobile communications system and that is accessed by a terminal in a wireless manner, and may be a NodeB (NodeB), an evolved NodeB (eNodeB), a base station in a 5G mobile communications system, a base station in a future mobile communications system, an access node in a Wi-Fi system, or the like. A specific technology and a specific device form used by the network device are not limited in the embodiments of this application.

The terminal device (Terminal equipment) may also be referred to as a terminal, user equipment (user equipment, UE), a mobile station (mobile station, MS), a mobile terminal (mobile terminal, MT), or the like. The terminal device may be a mobile phone (mobile phone), a tablet computer (Pad), a computer with a wireless sending/receiving function, a virtual reality (Virtual Reality, VR) terminal device, an augmented reality (Augmented Reality, AR) terminal device, a wireless terminal in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like.

It should be understood that in an NR system, data scheduling may start from a first symbol of a time resource unit, or may start from a middle symbol. For example, first several symbols of the time resource unit are used to transmit downlink control information. In addition, data scheduling may end on a last symbol, or end several symbols before the last symbol. For example, last several symbols of the time resource unit are used to transmit uplink control information.

The data mentioned in this application is user-plane data rather than control-plane data, and is, for example, downlink data sent by the network device to the terminal device or uplink data sent by the terminal device to the network device.

Figure 2:
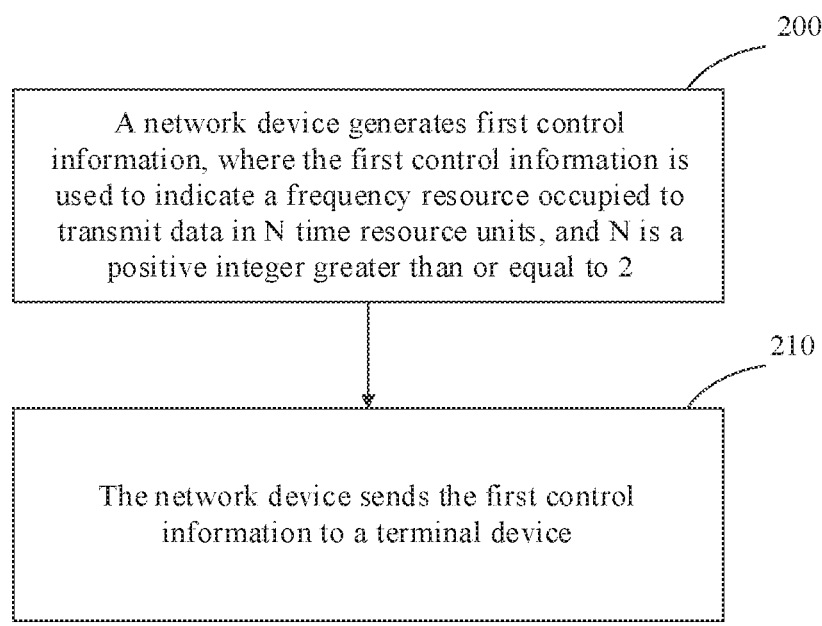
FIG. 2 is an overview flowchart 1 of a resource indication method according to this application.

Referring to FIG. 2, this application provides a resource indication method. The method includes:

Step 200: A network device generates first control information, where the first control information is used to indicate a frequency resource occupied to transmit data in N time resource units, and N is a positive integer greater than or equal to 2.

Step 210: The network device sends the first control information to a terminal device.

In this application, the time resource unit is one of a symbol, a slot (slot), a mini-slot (mini slot), a subframe, or a frame. The N time resource units may be different. For example, some of the N time resource units are slots, and some time resource units are mini slots. It should be understood that the frequency resource indicated by the first control information may be a frequency resource occupied when the network device sends data to the terminal device, or may be a frequency resource occupied when the terminal device sends data to the network device.

The first control information may include but is not limited to the following several possible forms. The following describes the possible forms with reference to the accompanying drawings.

Form 1 is as follows:

The first control information indicates a frequency resource occupied to transmit data in each time resource unit.

The foregoing form is applicable to a scenario in which data transmission in each time resource unit occupies a different frequency resource.

It is assumed that N slots are scheduled in DCI, and a frequency resource occupied to transmit data in each slot is indicated in the DCI. The first control information may be in the following two specific forms:

(1) A frequency resource is indicated in a form of a bitmap, that is, a bitmap is indicated for each slot. This is similar to the existing resource allocation type 0 or 1 of the PDSCH.

(2) Any two of a start location of a frequency resource, a length of the frequency resource, or an end location of the frequency resource are indicated for each slot. This is similar to the existing resource allocation type 2 of the PDSCH or the existing resource allocation type 0 or 1 of the PUSCH. Specifically, the following three combinations are included: a start location+a length, a length+an end location, or a start location+an end location.

Figure 3:
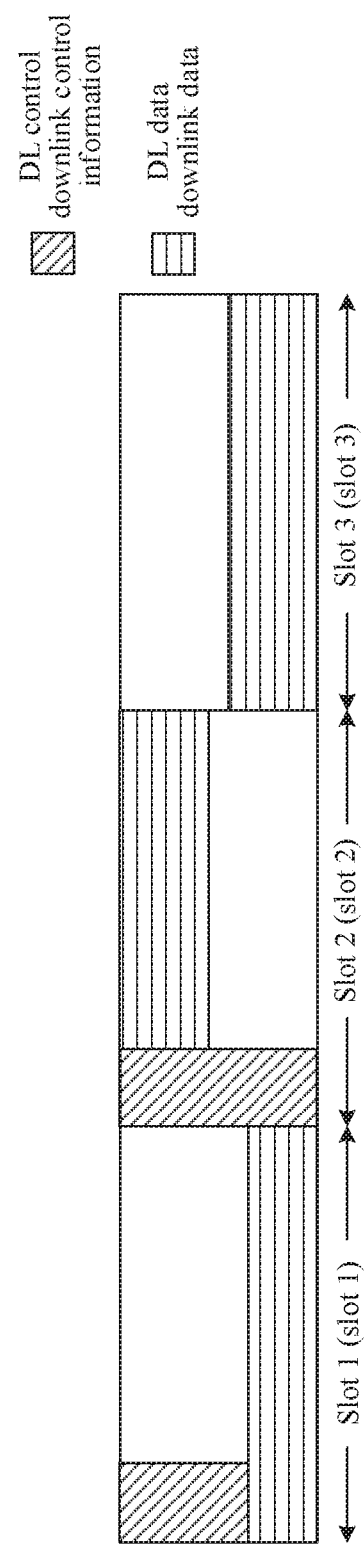
FIG. 3 is a schematic diagram 1 of a frequency resource configuration according to this application.

As shown in FIG. 3, downlink data scheduling is used as an example (uplink data scheduling is similar to downlink data scheduling, and the "downlink" may be replaced with the "uplink"). DCI in the first slot is used to schedule downlink data in a slot 1, a slot 2, and a slot 3, that is, the DCI in the first slot carries the first control information. Because frequency resources occupied to transmit data in different slots are different, the frequency resources need to be separately indicated.

Form 2 is as follows:

The first control information indicates a first frequency resource, and the first frequency resource is a frequency resource occupied to transmit data in each of the N time resource units.

The foregoing form is applicable to a scenario in which data transmission in each time resource unit occupies a same frequency resource. Therefore, the first control information needs to indicate only one frequency resource.

It is assumed that N slots are scheduled in DCI, and a same frequency resource occupied to transmit data in each slot is indicated in the DCI. The first control information may be in the following two specific forms:

(1) A same bitmap is indicated for N slots.

(2) Any two of a start location of a same frequency resource, a length of the frequency resource, or an end location of the frequency resource are indicated for N slots.

Figure 4:
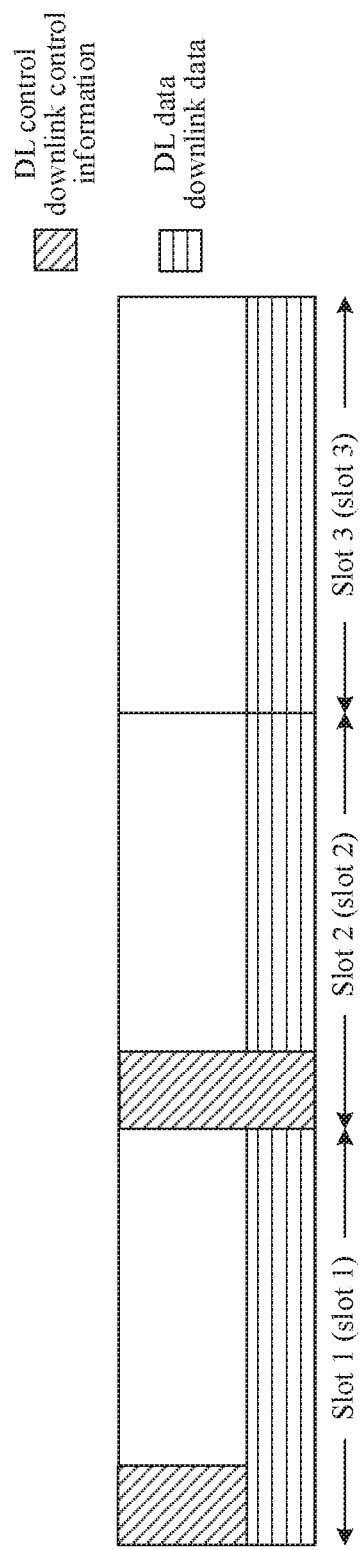
FIG. 4 is a schematic diagram 2 of a frequency resource configuration according to this application.

As shown in FIG. 4, frequency resources occupied to transmit data in three time resource units are the same, and the second form can effectively reduce control signaling overheads.

Form 3 is as follows:

The first control information indicates a second frequency resource, the second frequency resource is a frequency resource occupied to transmit data in M of the N time resource units, M<N, and M is a positive integer greater than or equal to 2; and the first control information further indicates a frequency resource occupied to transmit data in each time resource unit other than the M time resource units of the N time resource units.

The foregoing manner is applicable to a case in which frequency resources occupied to transmit data in some of the N time resource units are the same, and frequency resources occupied to transmit data in the other time resource units are different.

Assuming that N slots are scheduled in the DCI, frequency resources occupied to transmit data in M time resource units are the same, and may be uniformly indicated, and frequency resources occupied to transmit data in N-M time resource units are different, and need to be separately indicated.

Figure 5:
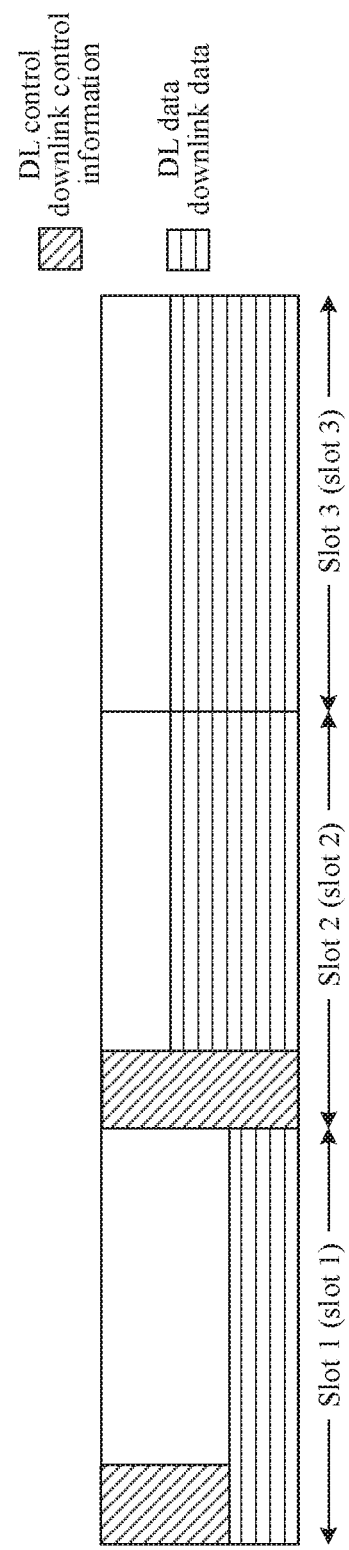
FIG. 5 is a schematic diagram 3 of a frequency resource configuration according to this application.

As shown in FIG. 5, frequency resources occupied to transmit data in a slot 2 and a slot 3 are the same, and may be uniformly indicated. A frequency resource occupied to transmit data in a slot 1 needs to be independently indicated.

In form 3, a correspondence between a frequency resource and a slot further needs to be indicated. For example, N slots are scheduled in the DCI, two frequency resources are indicated, and a correspondence between the two frequency resources and slots is indicated in a bitmap form. It is assumed that a length of the bitmap is N. In the bitmap, "1" indicates that a frequency resource occupied to transmit data in the slot is a first frequency resource, and "0" indicates that a frequency resource occupied to transmit data in the slot is a second frequency resource. Certainly, the correspondence between a frequency resource and a slot may alternatively be indicated in another manner. For example, the DCI indicates a frequency resource, and also indicates a slot corresponding to the frequency resource. A specific implementation method is not limited in this application.

Therefore, manner 3 has scheduling flexibility to some extent, and can reduce signaling overheads to some extent.

Form 4 is as follows:

Form 4 includes the following several specific cases:

Case a: The first control information indicates a third frequency resource and an offset between the third frequency resource and a frequency resource occupied to transmit data in a time resource unit other than a first time resource unit of the N time resource units, and the third frequency resource is a frequency resource occupied to transmit data in the first time resource unit of the N time resource units.

For example, assuming that N=3, the first control information indicates a frequency resource occupied to transmit data in a slot 1, an offset t2 of a slot 2, and an offset t3 of a slot 3. The offset t2 is an offset between a frequency resource occupied to transmit data in the slot 2 and the frequency resource occupied to transmit data in the slot 1. The offset t3 is an offset between a frequency resource occupied to transmit data in the slot 3 and the frequency resource occupied to transmit data in the slot 1.

For another example, assuming that N=4, the first control information indicates a frequency resource occupied to transmit data in a slot 1, and the first control information indicates only one offset t, where the offset t is an offset relative to the frequency resource occupied to transmit data in the slot 1, and an offset of each slot is a multiple of t. In this case, an offset between a frequency resource occupied to transmit data in a slot 2 and the frequency resource occupied to transmit data in the slot 1 is t, an offset between a frequency resource occupied to transmit data in a slot 3 and the frequency resource occupied to transmit data in the slot 1 is 2t, and an offset between a frequency resource occupied to transmit data in a slot 4 and the frequency resource occupied to transmit data in the slot 1 is 3t.

Case b: The first control information indicates a third frequency resource and an offset between a frequency resource occupied to transmit data in an $i^{th}$ time resource unit and a frequency resource occupied to transmit data in an $(i-1)^{th}$ time resource unit, and i is a positive integer from 2 to N.

For example, the first control information indicates a frequency resource occupied to transmit data in a slot 1, an offset t2 of a slot 2, and an offset t3 of a slot 3. The offset t2 is an offset between a frequency resource occupied to transmit data in the slot 2 and the frequency resource occupied to transmit data in the slot 1. The offset t3 is an offset between a frequency resource occupied to transmit data in the slot 3 and the frequency resource occupied to transmit data in the slot 2.

Case c: The first control information indicates a third frequency resource and an offset between a frequency resource occupied to transmit data in a $j^{th}$ time resource unit and a frequency resource occupied to transmit data in a $(j+1)^{th}$ time resource unit, and j is a positive integer from 1 to N−1.

For example, the first control information indicates a frequency resource occupied to transmit data in a slot 3, an offset t2 of a slot 2, and an offset t1 of a slot 1. The offset t2 is an offset between a frequency resource occupied to transmit data in the slot 2 and the frequency resource occupied to transmit data in the slot 3. The offset t1 is an offset between a frequency resource occupied to transmit data in the slot 1 and the frequency resource occupied to transmit data in the slot 2.

Similarly, case b and case c may be combined. An offset of each of some slots is an offset between a frequency resource occupied to transmit data in the slot and a frequency resource occupied to transmit data in a previous slot, and an offset of each of some slots is an offset between a frequency resource occupied to transmit data in the slot and a frequency resource occupied to transmit data in a next slot. For example, assuming that N=5, the first control information indicates a frequency resource occupied to transmit data in a slot 3, an offset t1 of a slot 1, an offset t2 of a slot 2, an offset t4 of a slot 4, and an offset t5 of a slot 5. In this case, the offset t2 is an offset between a frequency resource occupied to transmit data in the slot 2 and the frequency resource occupied to transmit data in a slot 3, the offset t 1 is an offset between a frequency resource occupied to transmit data in the slot 1 and the frequency resource occupied to transmit data in the slot 2, the offset t4 is an offset between a frequency resource occupied to transmit data in the slot 4 and the frequency resource occupied to transmit data in the slot 3, and the offset t5 is an offset between a frequency resource occupied to transmit data in the slot 5 and the frequency resource occupied to transmit data in the slot 4.

Case d: The first control information indicates an offset between a fourth frequency resource and a frequency resource occupied to transmit data in each of the N time resource units, and the fourth frequency resource is a configured or preconfigured frequency resource.

Case d is similar to case a, and a difference lies in that the fourth frequency resource is a configured or preconfigured frequency resource, that is, specified in a standard, notified by using a system broadcast message, or configured by using RRC signaling, but the third frequency resource in case a is indicated by the first control information.

Case e: The first control information indicates an offset between a fourth frequency resource and a frequency resource occupied to transmit data in a first time resource unit of the N time resource units, and an offset between a frequency resource occupied to transmit data in a $p^{th}$ time resource unit and a frequency resource occupied to transmit data in a $(p-1)^{th}$ time resource unit, and p is a positive integer from 2 to N.

Case e is similar to case b, and a difference is the same as that between case d and case a.

Case f: The first control information indicates an offset between a fourth frequency resource and a frequency resource occupied to transmit data in a first time resource unit of the N time resource units, and an offset between a frequency resource occupied to transmit data in a $q^{th}$ time resource unit and a frequency resource occupied to transmit data in a $(q+1)^{th}$ time resource unit, and q is a positive integer from 1 to N−1.

Case f is similar to case c, and a difference is the same as that between case d and case a. Similarly, case e and case f may be combined, which is the same as a case in which case b and case c are combined.

The first time resource unit is any one of the N time resource units.

The offset is at least one of the following: a bit offset in a bitmap, a subcarrier offset, a physical resource block (physical resource block, PRB) offset, a VRB offset, an RBG offset, and a multiple of a step value, where the step value is a bit quantity, a subcarrier quantity, a PRB quantity, a VRB quantity, an RBG quantity, or 1/K of a carrier bandwidth, where K is a positive integer. The step value is configured or preconfigured.

For example, the step value may be specified in a standard, notified by using a system broadcast message, or configured by using RRC signaling.

The following provides descriptions with reference to different types of offsets by using examples, and this is not intended to limit this application.

Embodiment 1: An Offset is a Bit Offset in a Bitmap

In the solution in case a, the first control information indicates that the frequency resource occupied to transmit data in the slot 1 corresponds to a bitmap 1. If the first control information further indicates that an offset between the frequency resource occupied to transmit data in the slot 2 and the frequency resource occupied to transmit data in the slot 1 is t, the frequency resource occupied to transmit data in the slot 2 is obtained by cyclically shifting the bitmap 1 by t bits.

It is assumed that the bitmap 1 is 0110. If the step value is 1, there are four types of offsets in total: 0, 1, 2, and 3, and corresponding bitmaps are respectively 0110, 0011, 1001, and 1100. Therefore, the first control information indicates the offset only by using two bits: 00, 01, 10, or 11. If the step value is 2, there are two types of offsets in total: 0 and 2, and corresponding bitmaps are respectively 0110 and 1001. In this case, the first control information indicates the offset only by using one bit: 0 or 1.

Figure 6:
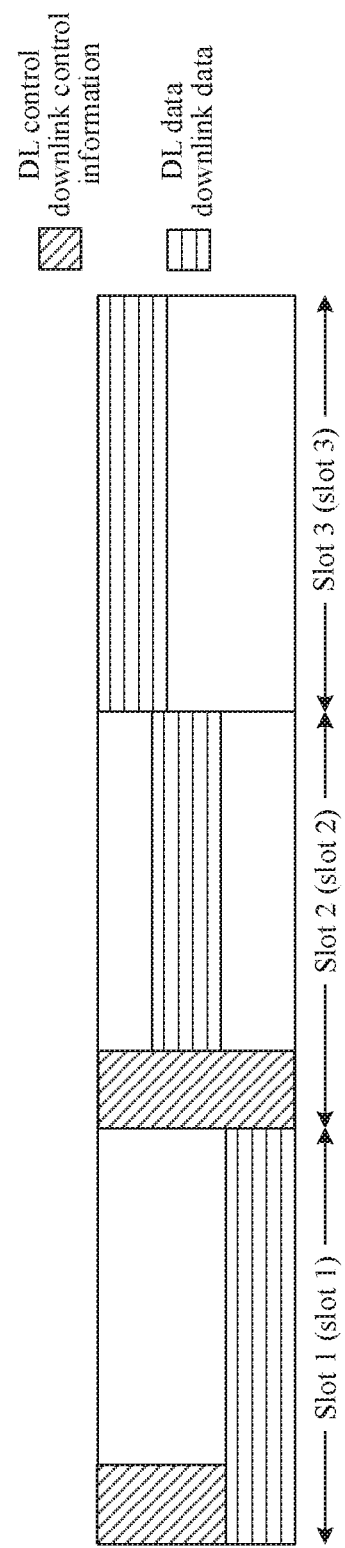
FIG. 6 is a schematic diagram 4 of a frequency resource configuration according to this application.

It should be noted that, for downlink scheduling, refer to FIG. 6. For uplink scheduling, refer to FIG. 7. In the foregoing solution, sizes of frequency resources occupied to transmit data in all slots are the same. Because a bitmap is cyclically shifted only and a quantity of is in the bitmap is not increased, this manner ensures scheduling flexibility, can obtain a frequency diversity gain between time resource units, and reduces signaling overheads.

Figure 7:
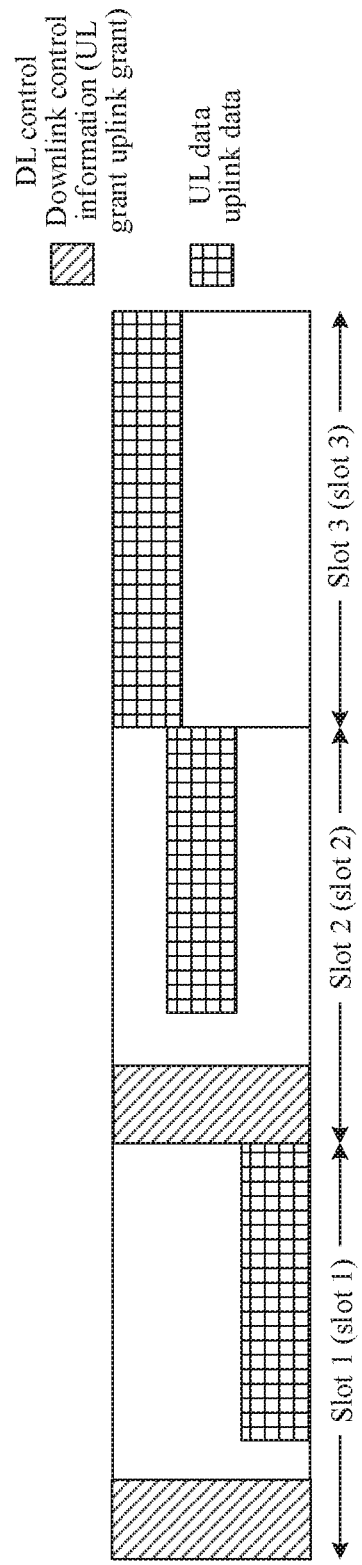
FIG. 7 is a schematic diagram 5 of a frequency resource configuration according to this application.

In FIG. 7, DCI in a first slot, that is, an uplink grant (UL grant), indicates frequency resources occupied by UE to transmit data in a slot 1, a slot 2, and a slot 3. It should be noted that, a gap (gap) exists between the UL grant and uplink data (UL data), and is used for uplink and downlink switching. In the slot 1, the UL grant schedules a frequency resource in the current slot to be used by the terminal device to transmit uplink data. Frequency resources occupied to transmit data in the slot 2 and the slot 3 are indicated by the UL grant in the slot 1, and DCI in the slot 2 indicates another terminal device.

Other cases are similar, and details are not described herein in this application.

Embodiment 2: An Offset is a Subcarrier Offset, a PRB Offset, a VRB Offset, or an RBG Offset A start location of a frequency resource is used as an example below. Similarly, the first control information may indicate an end location of the frequency resource and a length of the frequency resource.

In the solution in case a, the first control information indicates a start location P1 of the frequency resource occupied to transmit data in the slot 1. If the first control information indicates that an offset between a start location of the frequency resource occupied to transmit data in the slot 2 and the start location of the frequency resource occupied to transmit data in the slot 1 is t, where t may be t subcarriers, t PRBs, t VRBs, or t RBGs, the start location of the frequency resource occupied to transmit data in the slot 2 is (P1+t)mod M, (P1−t)mod M, (P1/t)mod M, (P1*t) mod M, or the like, where M is a carrier bandwidth or a total quantity of frequency resources of a carrier bandwidth supported by the terminal device. The carrier bandwidth is configured or indicated by the network device for the terminal device, or is notified by the terminal device to the network device or is applied for from the network device.

Other cases are similar, and details are not described herein in this application.

Embodiment 3: An Offset is a Multiple of a Step Value

For example, the step value is ¼ of a carrier bandwidth or ¼ of a total quantity of frequency resources of a carrier bandwidth supported by the terminal, and the offset t indicates an offset of ¼ of the carrier bandwidth or ¼ of the total quantity of frequency resources of the carrier bandwidth supported by the terminal. In this way, the offset needs to be indicated by using only two bits. For example, 00 indicates an offset of 0/4 of the carrier bandwidth of the UE or 0/4 of the total quantity of frequency resources of the carrier bandwidth supported by the terminal, 01 indicates an offset of ¼ of the carrier bandwidth or ¼ of the total quantity of frequency resources of the carrier bandwidth supported by the terminal, 10 indicates an offset of ¾ of the carrier bandwidth or ¾ of the total quantity of frequency resources of the carrier bandwidth supported by the terminal, and 11 indicates an offset of 4/4 of the carrier bandwidth or 4/4 of the total quantity of frequency resources of the carrier bandwidth supported by the terminal. A specific indication manner is similar to that in Embodiment 2.

The carrier bandwidth is configured or indicated by the network device for the terminal device, or is notified by the terminal device to the network device or is applied for from the network device.

Figure 8:
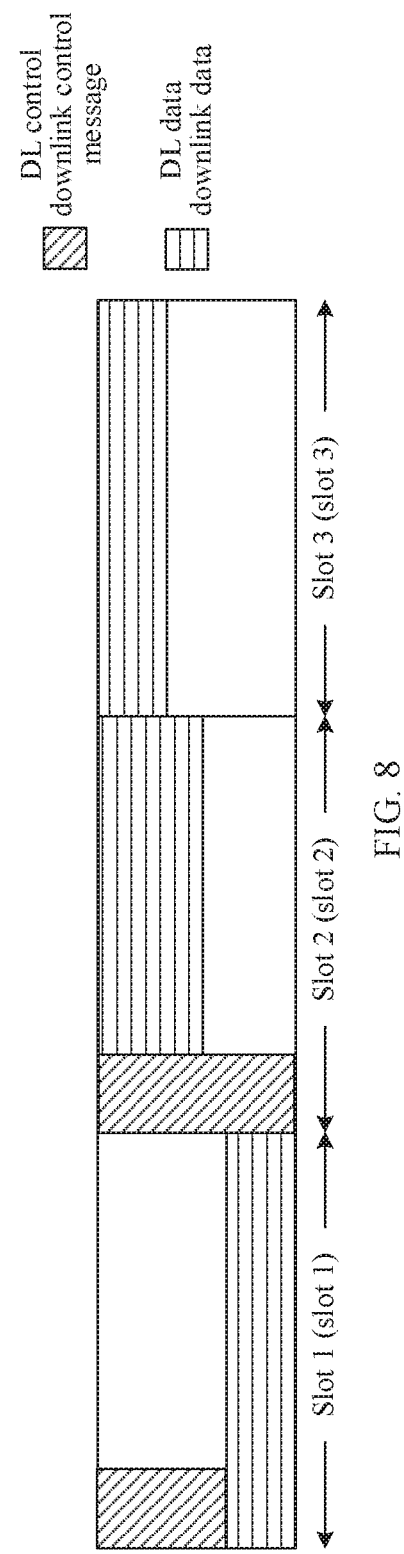
FIG. 8 is a schematic diagram 6 of a frequency resource configuration according to this application.

As shown in FIG. 8, a start location of a frequency resource, an end location of the frequency resource, and a length of the frequency resource may all be indicated in the manner in Embodiment 2 or Embodiment 3, and sizes of frequency resources occupied to transmit data in all time resource units may be different. Therefore, this ensures scheduling flexibility, can obtain a frequency diversity gain between time resource units, and reduces signaling overheads.

In the embodiment shown in FIG. 2, the first control information is used to indicate the frequency resource occupied to transmit data in the N time resource units. In addition, because slot aggregation or subframe aggregation is supported in an NR system, the first control information may be further used to indicate a time resource occupied to transmit data in the N time resource units. Details are shown in FIG. 9.

Figure 9:
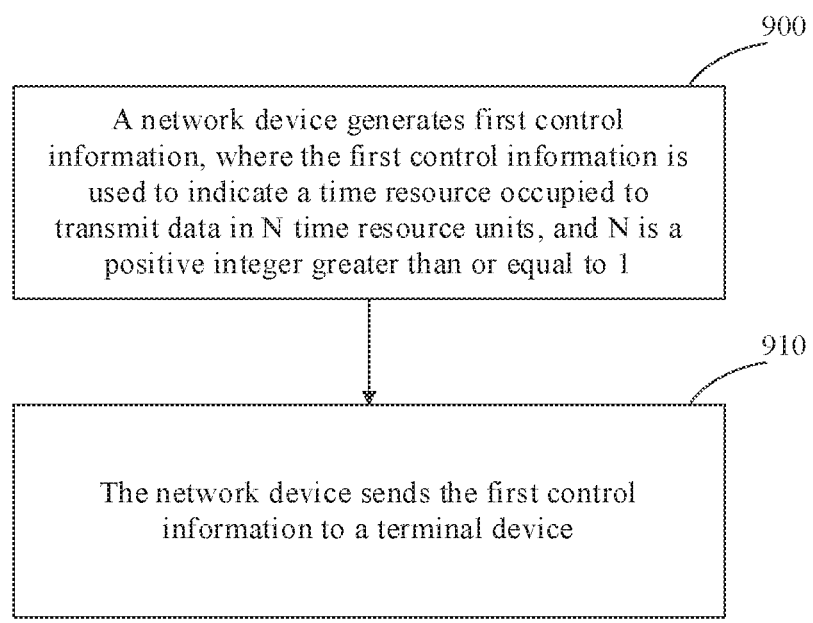
FIG. 9 is an overview flowchart 2 of a resource indication method according to this application.

Referring to FIG. 9, this application provides a resource indication method. The method includes:

Step 900: A network device generates first control information, where the first control information is used to indicate a time resource occupied to transmit data in N time resource units, and N is a positive integer greater than or equal to 1.

Step 910: The network device sends the first control information to a terminal device.

The time resource indicated by the first control information is a time resource occupied when the network device sends data to the terminal device, or may be a time resource occupied when the terminal device sends data to the network device.

It should be understood that the first control information in the embodiment shown in FIG. 9 may be the same as or different from the first control information in the embodiment shown in FIG. 2. Therefore, the first control information indicates the time resource and/or the frequency resource occupied to transmit data in the N time resource units.

The first control information may include but is not limited to the following several possible forms. The following describes the possible forms with reference to the accompanying drawings.

Form 1 is as follows:

The first control information indicates a time resource occupied to transmit data in each time resource unit.

The foregoing manner is applicable to a scenario in which data transmission in each time resource unit occupies a different time resource.

It is assumed that N slots are scheduled in DCI, and time resources scheduled in the N slots are separately indicated. For example, any two of a start location of a time resource, a length of the time resource, or an end location of the time resource are indicated for each slot.

For example, the start location of the time resource unit includes four cases, and is indicated by using two bits:

00: the start location is a first symbol;
01: the start location is a second symbol;
10: the start location is a third symbol; and
11: the start location is a fourth symbol.

Likewise, corresponding quantization may also be performed on the end location of the time resource unit and the length of the time resource unit, to reduce signaling overheads.

Figure 10:
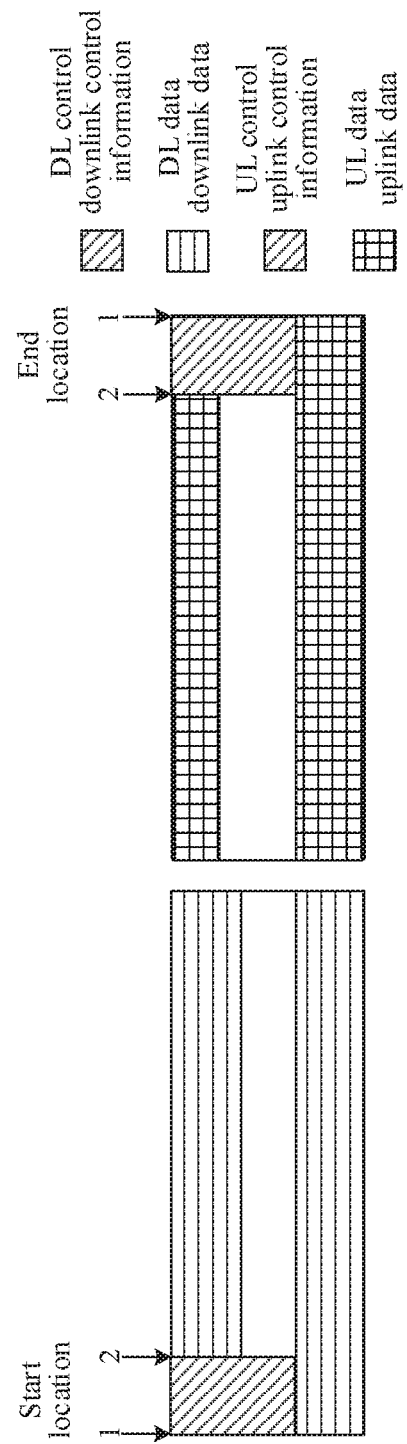
FIG. 10 is a schematic diagram 1 of a time resource configuration according to this application.

It should be noted that the start location of the time resource or the end location of the time resource may be calculated by using an area of control signaling under a specific condition. For example, if the terminal device has known a time domain resource location and a frequency resource location that are occupied to transmit the control signaling in a time resource unit, the terminal may calculate a corresponding time domain resource location based on a frequency resource location indication in the DCI. In addition, as shown in FIG. 10, there may be more than one start location of the time resource or more than one end location of the time resource, and there are two start locations of the time resource and two end locations of the time resource.

It should be understood that the start location of the time resource or the end location of the time resource may be an absolute value or a relative value of an index of a symbol in the time resource unit. The absolute value may be an index of a symbol in the time resource unit. The relative value may be an offset between an index of a symbol occupied by the start location (or the end location) of the time resource in the time resource unit and an index of a symbol in the time resource unit. For example, the symbol may be a first symbol, a last symbol, or the like in the time resource unit. The length of the time resource is a quantity of symbols occupied to transmit data.

Form 2 is as follows:

The first control information indicates a first time resource, and the first time resource is a time resource occupied to transmit data in each of the N time resource units.

The foregoing manner is applicable to a scenario in which data transmission in each time resource unit occupies a same time resource. Therefore, the first control information needs to indicate only one time resource.

For example, the first control information uniformly indicates a start location of a time resource unit. When the time resource units have different lengths, the first control information may further indicate different duration of each time resource unit. When the time resource units have a same length, the first control information uniformly indicates one duration.

Figure 11:
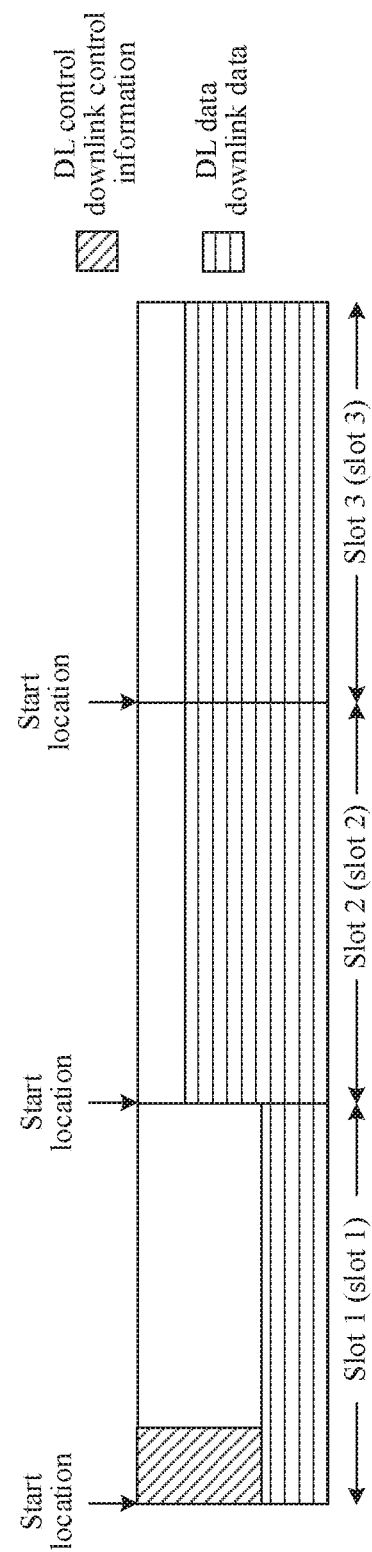
FIG. 11 is a schematic diagram 2 of a time resource configuration according to this application.

As shown in FIG. 11, downlink data scheduling is used as an example (uplink data scheduling is similar to downlink data scheduling, and the "downlink" may be replaced with the "uplink"). DCI in a first slot is used to schedule downlink data in a slot 1, a slot 2, and a slot 3, and the first control information uniformly indicates that the start location of the time resource unit is a first symbol.

Therefore, form 2 can effectively reduce control signaling overheads.

Form 3 is as follows:

The first control information indicates a second time resource, the second time resource is a time resource occupied to transmit data in M of the N time resource units, M<N, and M is a positive integer greater than or equal to 2. The first control information further indicates a time resource occupied to transmit data in each time resource unit other than the M time resource units of the N time resource units.

The foregoing manner is applicable to a scenario in which time resources occupied to transmit data in some of the N time resource units are the same, and time resources occupied to transmit data in the other time resource units are different.

The start location of the time resource is used as an example. Assuming that N slots are scheduled in the DCI, if time resources occupied to transmit data in M time resource units have a same start location, the time resources may be uniformly indicated, and if end locations of the time resources or lengths of the time resources are different, the time resources need to be separately indicated.

Figure 12:
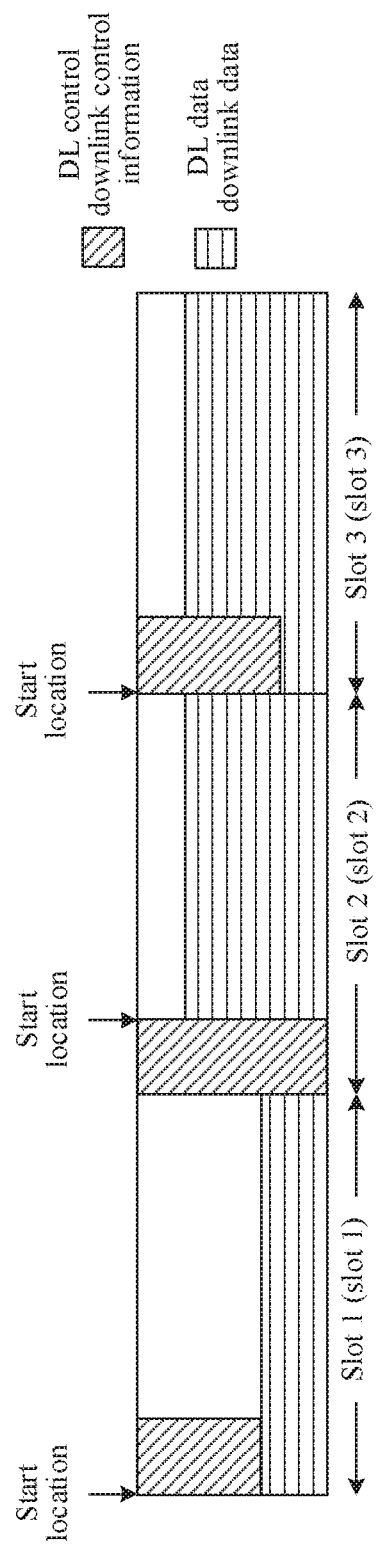
FIG. 12 is a schematic diagram 3 of a time resource configuration according to this application.

As shown in FIG. 12, time resources occupied to transmit data in a slot 1 and a slot 3 have a same start location, and may be uniformly indicated. A start location of a time resource occupied to transmit data in a slot 2 is different from the start locations of the time resources occupied to transmit data in the slot 1 and the slot 3, and the time resource needs to be independently indicated.

Similar to manner 3 in the embodiment shown in FIG. 2, a correspondence between a frequency resource and a slot also needs to be indicated.

Therefore, manner 3 has scheduling flexibility to some extent, and can reduce signaling overheads to some extent.

Form 4 is as follows:

Form 4 includes the following several specific cases:

Case a: The first control information indicates a third time resource and an offset between the third time resource and a time resource occupied to transmit data in a time resource unit other than a first time resource unit of the N time resource units, and the third time resource is a time resource occupied to transmit data in the first time resource unit of the N time resource units.

Case b: The first control information indicates a third time resource and an offset between a time resource occupied to transmit data in an $i^{th}$ time resource unit and a time resource occupied to transmit data in an $(i-1)^{th}$ time resource unit, $i \geq 2$, and i is a positive integer from 2 to N.

Case c: The first control information indicates a third time resource and an offset between a time resource occupied to transmit data in a $j^{th}$ time resource unit and a time resource occupied to transmit data in a $(j+1)^{th}$ time resource unit, and j is a positive integer from 1 to N−1.

Case d: The first control information indicates an offset between a fourth time resource and a time resource occupied to transmit data in each of the N time resource units, and the fourth time resource is a configured or preconfigured time resource.

Case e: The first control information indicates an offset between a fourth time resource and a time resource occupied to transmit data in a first time resource unit of the N time resource units, and an offset between a time resource occupied to transmit data in a $p^{th}$ time resource unit and a time resource occupied to transmit data in a $(p-1)^{th}$ time resource unit, and p is a positive integer from 2 to N.

Case f: The first control information indicates an offset between a fourth time resource and a time resource occupied to transmit data in a first time resource unit of the N time resource units, and an offset between a time resource occupied to transmit data in a $q^{th}$ time resource unit and a time resource occupied to transmit data in a $(q+1)^{th}$ time resource unit, and q is a positive integer from 1 to N−1.

The first time resource unit is any one of the N time resource units.

It should be understood that the fourth manner is similar to the fourth manner in the embodiment shown in FIG. 2, and a main difference lies in that the offset is a symbol quantity, a mini-slot quantity, a multiple of a symbol quantity, a multiple of a mini-slot quantity, or a multiple of a step value. The step value is 1/K of a total quantity of symbols in a slot or a subframe, where K is a positive integer. The step value is configured or preconfigured.

Figure 13:
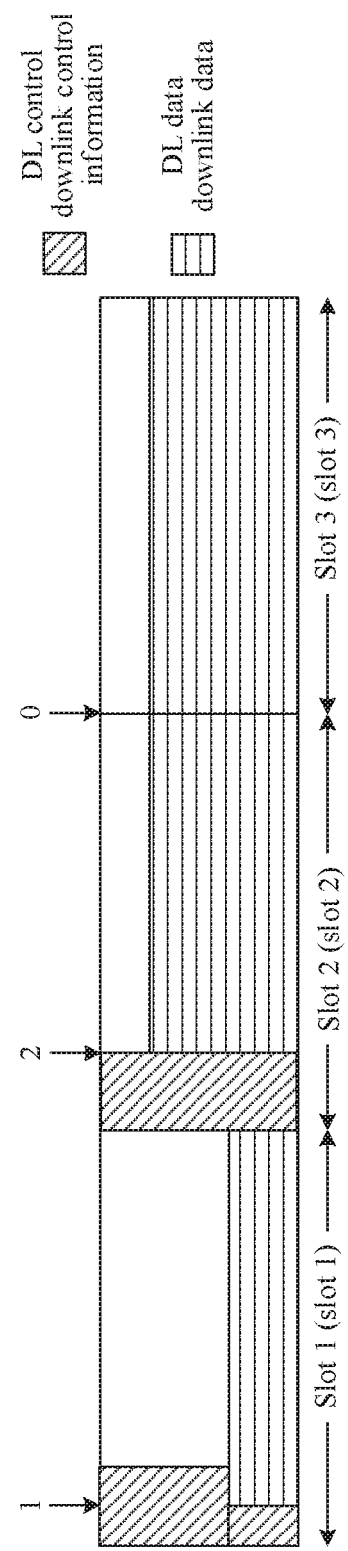
FIG. 13 is a schematic diagram 4 of a time resource configuration according to this application.

For example, as shown in FIG. 13, it is assumed that N slots are scheduled in the DCI and the first control message indicates that a start location of a time resource unit occupied to transmit data in a slot 1 is 1. If an offset t2 of a slot 2 is 1, and the offset t2 is an offset between a start location of a time resource unit occupied to transmit data in the slot 2 and the start location of the time resource unit occupied to transmit data in the slot 1, the start location of the time resource unit occupied to transmit data in the slot 2 is 2. If it is indicated that an offset t3 of a slot 3 is minus 1, and the offset t3 is an offset between a start location of a time resource unit occupied to transmit data in the slot 3 and the start location of the time resource unit occupied to transmit data in the slot 1, the start location of the time resource unit occupied to transmit data in the slot 3 is 0. An end location of the time resource unit and a length of the time resource unit may also be indicated by using a similar method.

Therefore, form 4 ensures scheduling flexibility, and can reduce DCI overheads.

Form 5 is as follows:

Form 5 may specifically include two scenarios:

Scenario 1: When the time resource indicated by the first control information is a time resource occupied when the network device sends data to the terminal device, the first control information indicates that a start symbol of a time resource occupied to transmit data in a $k^{th}$ time resource unit is a first symbol of the $k^{th}$ time resource unit, or is a first symbol after a symbol occupied by control signaling in the $k^{th}$ time resource unit, and the first control information indicates that an end symbol of the time resource occupied to transmit data in the $k^{th}$ time resource unit is a last symbol of the $k^{th}$ time resource unit, or is a last symbol before the symbol occupied by the control signaling in the $k^{th}$ time resource unit or before a symbol occupied by a gap in the $k^{th}$ time resource unit. k is 1 or a positive integer from 1 to N.

It should be understood that when the $j^{th}$ time resource unit is a slot of 14 symbols, a control symbol occupies a thirteenth symbol and a fourteenth symbol of the slot, the gap occupies a twelfth symbol, and a last symbol occupied by a data part is an eleventh symbol.

Figure 14:
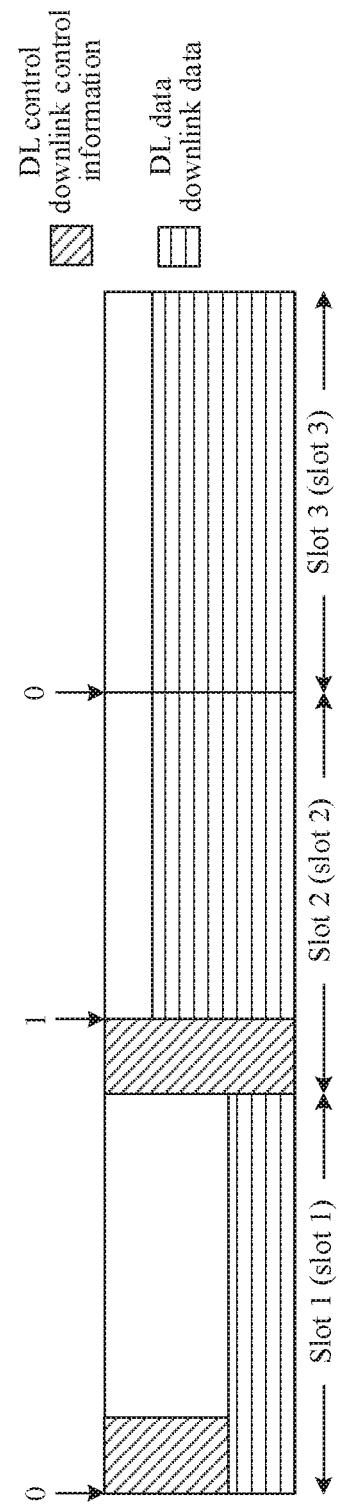
FIG. 14 is a schematic diagram 5 of a time resource configuration according to this application.

As shown in FIG. 14, the first control information indicates, by using one bit, the start location of the time resource occupied to transmit data in each time resource unit. Two cases are included: "0" indicates case 1 and "1" indicates case 2, where
  case 1: a first symbol in a time resource unit; and
  case 2: a first symbol after a symbol occupied by control signaling in a time resource unit.

Figure 15:
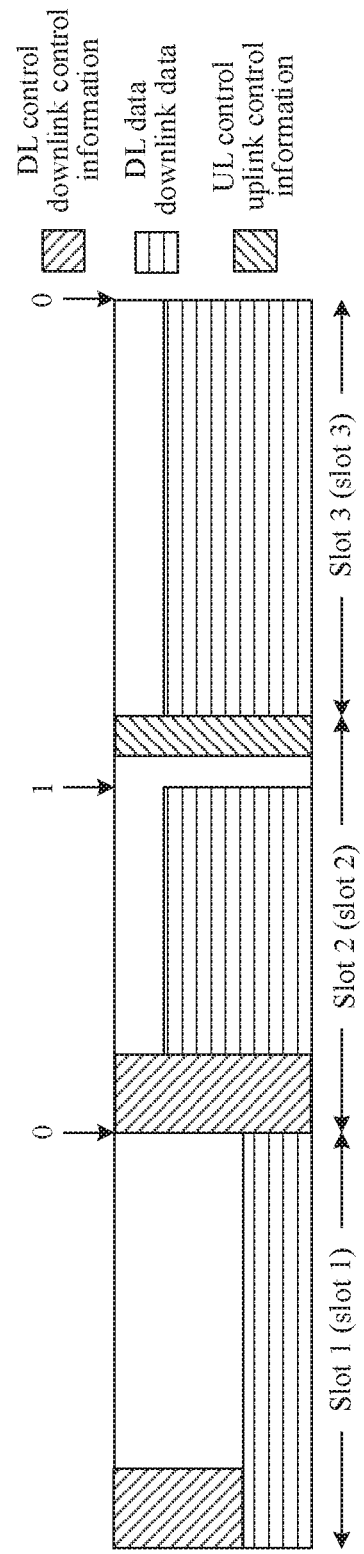
FIG. 15 is a schematic diagram 6 of a time resource configuration according to this application.

As shown in FIG. 15, the first control information indicates, by using one bit, the end location of the time resource occupied to transmit data in each time resource unit. Two cases are included: "0" indicates case 1 and "1" indicates case 2, where
  case 1: a last symbol in a time resource unit; and
  case 2: a last symbol before a symbol occupied by control signaling or a gap in a time resource unit.

Scenario 2: When the time resource indicated by the first control information is a time resource occupied when the terminal device sends data to the network device, the first control information indicates that a start symbol of a time resource occupied to transmit data in a $k^{th}$ time resource unit is a first symbol of the $k^{th}$ time resource unit, or is a first symbol after a symbol occupied by control signaling or a gap in the $k^{th}$ time resource unit, and the first control information indicates that an end symbol of the time resource occupied to transmit data in the $k^{th}$ time resource unit is a last symbol of the $k^{th}$ time resource unit, or is a last symbol before the symbol occupied by the control signaling in the $k^{th}$ time resource unit. k is 1 or a positive integer from 1 to N.

Figure 16:
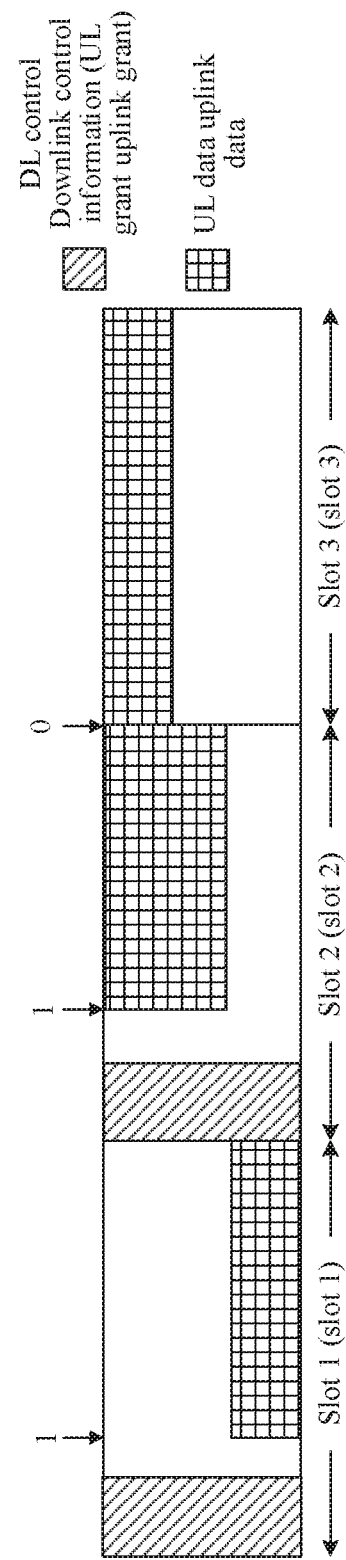
FIG. 16 is a schematic diagram 7 of a time resource configuration according to this application.

As shown in FIG. 16, the first control information indicates, by using one bit, the start location of the time resource occupied to transmit data in each time resource unit. Two cases are included: "0" indicates case 1 and "1" indicates case 2, where
  case 1: a first symbol in a time resource unit; and
  case 2: a first symbol after a symbol occupied by control signaling or a gap.

Figure 17:
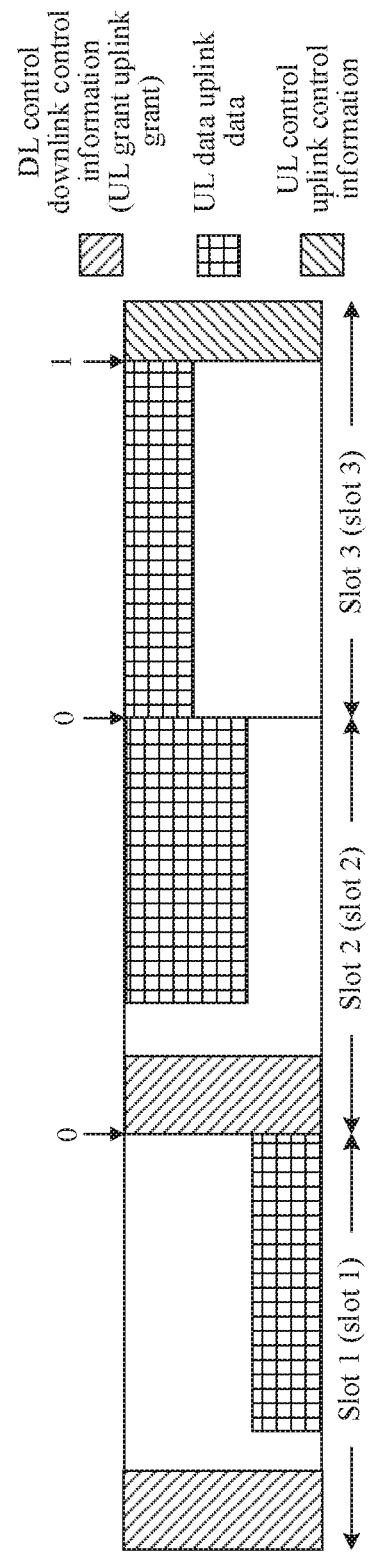
FIG. 17 is a schematic diagram 8 of a time resource configuration according to this application.

As shown in FIG. 17, the first control information indicates, by using one bit, the end location of the time resource occupied to transmit data in each time resource unit. Two cases are included: "0" indicates case 1 and "1" indicates case 2, where
  case 1: a last symbol in a time resource unit; and
  case 2: a last symbol before a symbol occupied by control signaling in a time resource unit.

Figure 18:
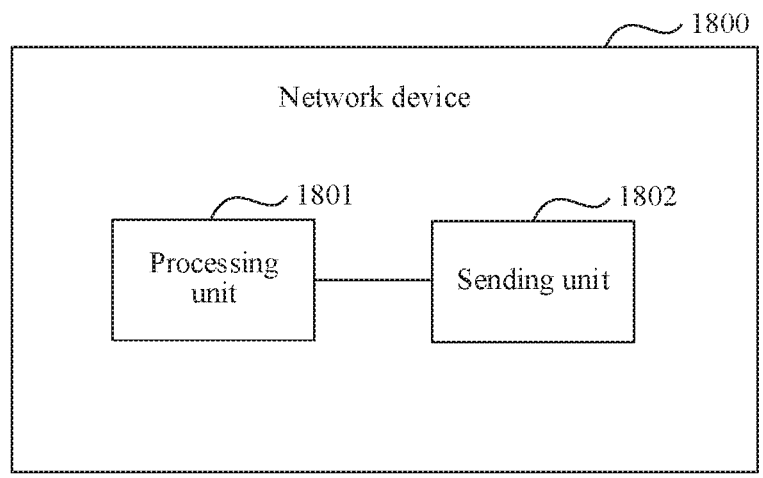
FIG. 18 is a schematic structural apparatus diagram of a network device according to this application.

Based on the foregoing embodiments, an embodiment of this application provides a network device, configured to perform the method shown in FIG. 2 or FIG. 9. Referring to FIG. 18, the network device 1800 includes: a processing unit 1801 and a sending unit 1802.

For details, refer to the method embodiment shown in FIG. 2 or FIG. 9. Details are not described herein again in this application.

Figure 19:
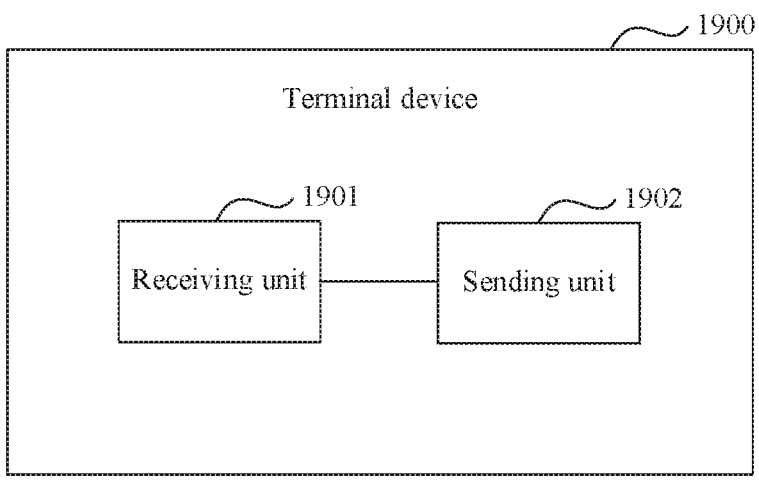
FIG. 19 is a schematic structural apparatus diagram of a terminal device according to this application.

Based on the foregoing embodiments, an embodiment of this application provides a terminal device, configured to perform the method shown in FIG. 2 or FIG. 9. Referring to FIG. 19, the terminal device 1900 includes: a receiving unit 1901 and a sending unit 1902.

For details, refer to the method embodiment shown in FIG. 2 or FIG. 9. Details are not described herein again in this application.

It should be understood that division of the units in the terminal device and the network device is merely logical function division. During actual implementation, all or some of the units may be integrated into one physical entity, or the units may be physically separated. In addition, the units all may be implemented by software invoked by a processing element, or all may be implemented by hardware, or some units may be implemented by software invoked by a processing element, and some units are implemented by hardware. For example, the processing unit may be a separately disposed processing element, may be implemented by being integrated into a chip, or may be stored in a memory in a form of a program, and a processing element invokes and executes the function of the unit. Implementations of the other units are similar. In addition, all or some of the units may be integrated together, or may be implemented independently. The processing element herein may be an integrated circuit with a signal processing capability. In an implementation process, steps in the foregoing methods or the foregoing units may be implemented by using a hardware integrated logical circuit in the processing element, or by using instructions in a form of software. In addition, the receiving unit is a unit configured to control receiving, and may receive information by using a receiving apparatus of the terminal device or the network device, for example, an antenna and a radio frequency apparatus. The sending unit is a unit configured to control sending, and may send information by using a sending apparatus of the terminal device or the network device, for example, an antenna and a radio frequency apparatus.

For example, the foregoing units may be one or more integrated circuits configured to implement the foregoing method, for example, one or more application-specific integrated circuits (Application Specific Integrated Circuits, ASIC), one or more digital signal processors (digital signal processor, DSP), or one or more field programmable gate arrays (Field Programmable Gate Array, FPGA). For another example, when one of the foregoing units is implemented by a processing element through invoking a program, the processing element may be a general-purpose processor, for example, a central processing unit (Central Processing Unit, CPU) or another processor that can invoke the program. For another example, the units may be integrated together, and implemented in a form of a system-on-a-chip (system-on-a-chip, SOC).

Figure 20:
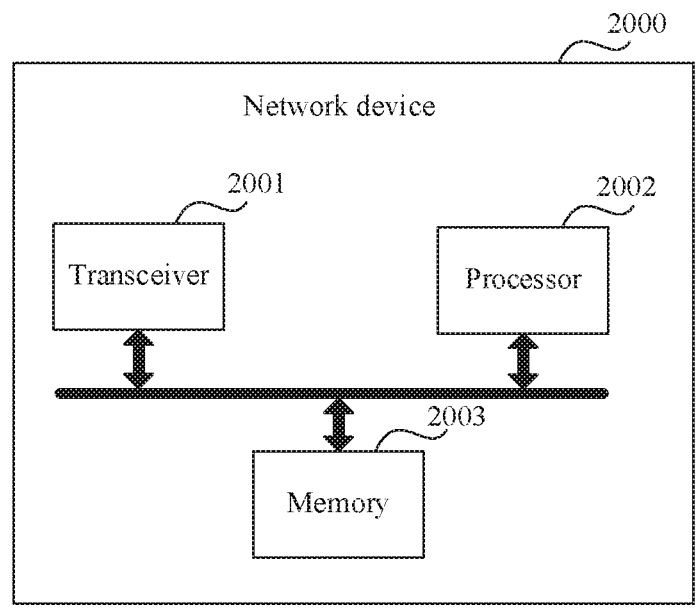
FIG. 20 is a schematic structural entity diagram of a network device according to this application.

Based on the foregoing embodiments, an embodiment of this application further provides a network device, configured to perform the method shown in FIG. 2 or FIG. 9. Referring to FIG. 20, the network device 2000 includes: a transceiver 2001, a processor 2002, and a memory 2003. A function of the sending unit 1802 in FIG. 18 is implemented by using the transceiver 2001, and a function of the processing unit 1801 is implemented by using the processor 2002.

The memory 2003 is configured to store a program, an instruction, and the like. Specifically, the program may include program code, and the program code includes a computer operation instruction. The memory 2003 may include a RAM, or may include a non-volatile memory, for example, at least one magnetic disk storage. The processor 2002 executes the application program stored in the memory 2003 to implement the foregoing function, to perform the method shown in FIG. 9.

For details, refer to the method embodiment shown in FIG. 2 or FIG. 9. Details are not described herein again in this application.

Figure 21:
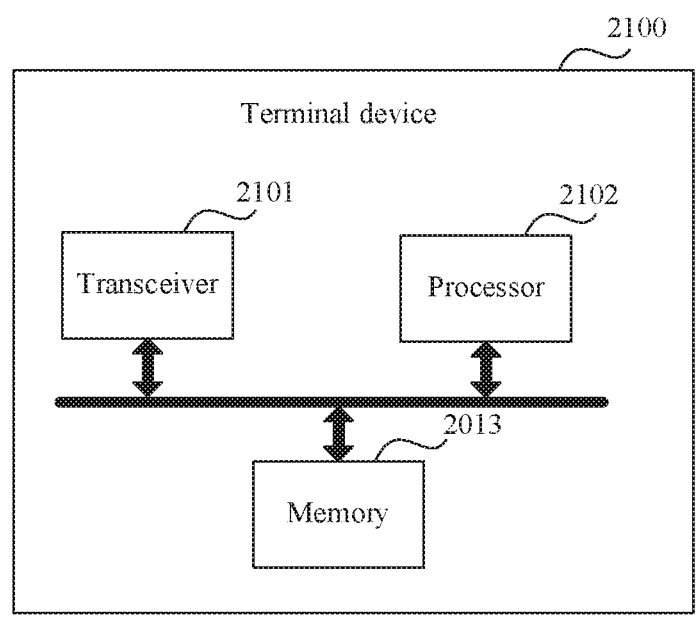
FIG. 21 is a schematic structural entity diagram of a terminal device according to this application.

Based on the foregoing embodiments, an embodiment of this application further provides a terminal device, configured to perform the method shown in FIG. 2 or FIG. 9. Referring to FIG. 21, the terminal device 2100 includes: a transceiver 2001, a processor 2002, and a memory 2003. Functions of the receiving unit 1901 and the sending unit 1902 are implemented by using the transceiver 2101.

The memory 2103 is configured to store a program, an instruction, and the like. Specifically, the program may include program code, and the program code includes a computer operation instruction. The memory 2103 may include a random access memory (random access memory, RAM), or may include a non-volatile memory (non-volatile memory), for example, at least one magnetic disk storage. The processor 2102 executes the application program stored in the memory 2103 to implement the foregoing function, to perform the method shown in FIG. 9.

For details, refer to the method embodiment shown in FIG. 2 or FIG. 9. Details are not described herein again in this application.

In conclusion, a network device generates first control information, where the first control information is used to indicate a frequency resource occupied to transmit data in N time resource units, and N is a positive integer greater than or equal to 2. The network device sends the first control information to a terminal device. Therefore, according to the method provided in this application, the network device may indicate, for the scheduled N time resource units, the frequency resource occupied to transmit data in the N time resource units, thereby reducing DCI overheads.

A network device generates first control information, where the first control information is used to indicate a time resource occupied to transmit data in N time resource units, and N is a positive integer greater than or equal to 1. The network device sends the first control information to a terminal device. Therefore, according to the method provided in this application, the network device may indicate, for the scheduled N time resource units, the time resource occupied to transmit data in the N time resource units, thereby reducing DCI overheads.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk storage, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

Apparently, a person skilled in the art can make various modifications and variations to the embodiments of this application without departing from the scope of the embodiments of this application. In this way, this application is intended to cover modifications and variations of the embodiments of this application provided that they fall within the scope defined by the claims of this application.

The invention claimed is:

1. A resource indication method, implemented by a network device, comprising:
generating first control information, wherein the first control information indicates a frequency resource occupied to transmit data in N time resource units, wherein N is a positive integer greater than or equal to 2, wherein the first control information indicates a first frequency resource, a second frequency resource, and a third frequency resource, wherein the first frequency resource is occupied to transmit first data in each of the N time resource units, wherein the second frequency resource is occupied to transmit second data in M time resource units of the N time resource units, wherein M is less than N, wherein the third frequency resource is occupied to transmit third data in each time resource unit other than the M time resource units of the N time resource units, and wherein the first control information further indicates one of:
the third frequency resource and an offset between the third frequency resource and a frequency resource occupied to transmit the data in a time resource unit other than a first time resource unit of the N time resource units, wherein the third frequency resource is a frequency resource occupied to transmit the data in the first time resource unit of the N time resource units;

the third frequency resource and an offset between a frequency resource occupied to transmit the data in an $i^{th}$ time resource unit and a frequency resource occupied to transmit the data in an $(i-1)^{th}$ time resource unit, wherein i is a positive integer from 2 to N;

the third frequency resource and an offset between a frequency resource occupied to transmit the data in a $j^{th}$ time resource unit and a frequency resource occupied to transmit the data in a $(j+1)^{th}$ time resource unit, wherein j is a positive integer from 1 to N−1;

an offset between a fourth frequency resource and a frequency resource occupied to transmit the data in each of the N time resource units, wherein the fourth frequency resource is a configured or preconfigured frequency resource;

an offset between the fourth frequency resource and a frequency resource occupied to transmit the data in the first time resource unit of the N time resource units and an offset between a frequency resource occupied to transmit the data in a $p^{th}$ time resource unit and a frequency resource occupied to transmit the data in a $(p-1)^{th}$ time resource unit, wherein p is a positive integer from 2 to N; or an offset between the fourth frequency resource and the frequency resource occupied to transmit the data in the first time resource unit of the N time resource units and an offset between a frequency resource occupied to transmit the data in a $q^{th}$ time resource unit and a frequency resource occupied to transmit the data in a $(q+1)^{th}$ time resource unit, wherein q is a positive integer from 1 to N−1, and wherein the first time resource unit is any one of the N time resource units; and sending the first control information to a terminal device.

2. The resource indication method of claim 1, wherein the offset is at least one of the following: a bit offset in a bitmap, a subcarrier offset, a physical resource block (PRB) offset, a virtual resource block (VRB) offset, a resource block group (RBG) offset, or a multiple of a step value, wherein the step value is one of a bit quantity, a subcarrier quantity, a PRB quantity, a VRB quantity, an RBG quantity, or 1/K of a carrier bandwidth, and wherein K is a positive integer.

3. The resource indication method of claim 1, wherein the N time resource units each are one of a symbol, a slot, a mini-slot, a subframe, or a frame.

4. The resource indication method of claim 1, wherein the N time resource units comprise a symbol.

5. The resource indication method of claim 1, wherein the N time resource units comprise a slot.

6. The resource indication method of claim 1, wherein the N time resource units comprise a mini-slot.

7. The resource indication method of claim 1, wherein the N time resource units comprise a subframe.

8. The resource indication method of claim 1, wherein the N time resource units comprise a frame.

9. The resource indication method of claim 1, wherein the offset is a bit offset in a bitmap.

10. The resource indication method of claim 1, wherein the offset is a subcarrier offset.

11. The resource indication method of claim 1, wherein the offset is a physical resource block (PRB) offset, a virtual resource block (VRB) offset, or a resource block group (RBG) offset.

12. A device, comprising:
a processor; and
a memory coupled to the processor and storing instructions that, when executed by the processor, cause the device to be configured to:
generate first control information, wherein the first control information indicates a frequency resource occupied to transmit data in N time resource units, wherein N is a positive integer greater than or equal to 2, wherein the first control information indicates a first frequency resource, a second frequency resource, and a third frequency resource, wherein the first frequency resource is occupied to transmit first data in each of the N time resource units, wherein the second frequency resource is occupied to transmit second data in M time resource units of the N time resource units, wherein M is less than N, wherein the third frequency resource is occupied to transmit third data in each time resource unit other than the M time resource units of the N time resource units; and units, and wherein the first control information further indicates one of:

the third frequency resource and an offset between the third frequency resource and a frequency resource occupied to transmit the data in a time resource unit other than a first time resource unit of the N time resource units, wherein the third frequency resource is a frequency resource occupied to transmit the data in the first time resource unit of the N time resource units;

the third frequency resource and an offset between a frequency resource occupied to transmit the data in an $i^{th}$ time resource unit and a frequency resource occupied to transmit the data in an $(i-1)^{th}$ time resource unit, wherein i is a positive integer from 2 to N;

the third frequency resource and an offset between a frequency resource occupied to transmit the data in a $j^{th}$ time resource unit and a frequency resource occupied to transmit the data in a $(j+1)^{th}$ time resource unit, wherein j is a positive integer from 1 to N−1;

an offset between a fourth frequency resource and a frequency resource occupied to transmit the data in each of the N time resource units, wherein the fourth frequency resource is a configured or preconfigured frequency resource;

an offset between the fourth frequency resource and a frequency resource occupied to transmit the data in a first time resource unit of the N time resource units, wherein an offset is between a frequency resource occupied to transmit the data in a $p^{th}$ time resource unit and a frequency resource occupied to transmit the data in a $(p-1)^{th}$ time resource unit, and wherein p is a positive integer from 2 to N; or an offset between the fourth frequency resource and the frequency resource occupied to transmit the data in the first time resource unit of the N time resource units, wherein an offset is between a frequency resource occupied to transmit the data in a $q^{th}$ time resource unit and a frequency resource occupied to transmit the data in a $(q+1)^{th}$ time resource unit, wherein q is a positive integer from 1 to N−1, and wherein the first time resource unit is any one of the N time resource units; and send the first control information to a terminal device.

13. The device of claim 12, wherein the offset is at least one of the following: a bit offset in a bitmap, a subcarrier offset, a physical resource block (PRB) offset, a virtual resource block (VRB) offset, a resource block group (RBG) offset, or a multiple of a step value, wherein the step value is one of a bit quantity, a subcarrier quantity, a PRB quantity, a VRB quantity, an RBG quantity, or 1/K of a carrier bandwidth, and wherein K is a positive integer.

14. The device of claim 12, wherein the N time resource units each are one of a symbol, a slot, a mini-slot, a subframe, or a frame.

15. The device of claim 12, wherein the N time resource units comprise a symbol.

16. The device of claim 12, wherein the N time resource units comprise a slot or a mini-slot.

17. The device of claim 12, wherein the N time resource units comprise a frame or a subframe.

18. A chip coupled to a memory and configured to read and execute a program stored in the memory to perform operations comprising:

generating first control information, wherein the first control information indicates a frequency resource occupied to transmit data in N time resource units, wherein N is a positive integer greater than or equal to 2, wherein the first control information indicates a first frequency resource, a second frequency resource, and a third frequency resource, wherein the first frequency resource is occupied to transmit first data in each of the N time resource units, wherein the second frequency resource is occupied to transmit second data in M time resource units of the N time resource units, wherein M is less than N, wherein the third frequency resource is occupied to transmit third data in each time resource unit other than the M time resource units of the N time resource units, and wherein the first control information further indicates one of:

the third frequency resource and an offset between the third frequency resource and a frequency resource occupied to transmit the data in a time resource unit other than a first time resource unit of the N time resource units, wherein the third frequency resource is a frequency resource occupied to transmit the data in the first time resource unit of the N time resource units;

the third frequency resource and an offset between a frequency resource occupied to transmit the data in an $i^{th}$ time resource unit and a frequency resource occupied to transmit the data in an $(i-1)^{th}$ time resource unit, wherein i is a positive integer from 2 to N;

the third frequency resource and an offset between a frequency resource occupied to transmit the data in a $j^{th}$ time resource unit and a frequency resource occupied to transmit the data in a $(j+1)^{th}$ time resource unit, wherein j is a positive integer from 1 to N−1;

an offset between a fourth frequency resource and a frequency resource occupied to transmit the data in each of the N time resource units, wherein the fourth frequency resource is a configured or preconfigured frequency resource;

the offset between the fourth frequency resource and a frequency resource occupied to transmit the data in a first time resource unit of the N time resource units, wherein an offset is between a frequency resource occupied to transmit the data in a $p^{th}$ time resource unit and a frequency resource occupied to transmit the data in a $(p-1)^{th}$ time resource unit, and wherein p is a positive integer from 2 to N; or an offset between the fourth frequency resource and the frequency resource occupied to transmit the data in the first time resource unit of the N time resource units, wherein an offset is between a frequency resource occupied to transmit the data in a $q^{th}$ time resource unit and a frequency resource occupied to transmit the data in a $(q+1)^{th}$ time resource unit, wherein q is a positive integer from 1 to N−1, and wherein the first time resource unit is any one of the N time resource units; and sending the first control information to a terminal device.

19. The chip of claim 18, wherein the offset is at least one of the following: a bit offset in a bitmap, a subcarrier offset, a physical resource block (PRB) offset, a virtual resource block (VRB) offset, a resource block group (RBG) offset, or a multiple of a step value, wherein the step value is one of a bit quantity, a subcarrier quantity, a PRB quantity, a VRB quantity, an RBG quantity, or 1/K of a carrier bandwidth, and wherein K is a positive integer.

20. The chip of claim 18, wherein the N time resource units each are one of a symbol, a slot, a mini-slot, a subframe, or a frame.

\* \* \* \* \*

UNITED STATES PATENT AND TRADEMARK OFFICE
CERTIFICATE OF CORRECTION

PATENT NO. : 11,363,607 B2
APPLICATION NO. : 16/638027
DATED : June 14, 2022
INVENTOR(S) : Da Wang, Yun Liu and Jian Wang It is certified that error appears in the above-identified patent and that said Letters Patent is hereby corrected as shown below:

In the Claims

Claim 12, Column 28, Line 18: "resource units; and units," should read "resource units,"

Signed and Sealed this
Eighteenth Day of October, 2022

Katherine Kelly Vidal
*Director of the United States Patent and Trademark Office*